United States Patent [19]
Nakamura et al.

[11] Patent Number: 5,889,928
[45] Date of Patent: Mar. 30, 1999

[54] OUTPUT GRADATION ADJUSTMENT METHOD IN IMAGE OUTPUT APPARATUS

[75] Inventors: Koji Nakamura; Masayuki Mizuno; Ryuichi Okumura, all of Osaka, Japan

[73] Assignee: MITA Industrial Co., Ltd., Osaka, Japan

[21] Appl. No.: 804,830

[22] Filed: Feb. 24, 1997

[30] Foreign Application Priority Data

Feb. 28, 1996 [JP] Japan .................................. 8-041800
Feb. 28, 1996 [JP] Japan .................................. 8-041801

[51] Int. Cl.$^6$ .............................. H04N 1/50; H04N 1/60
[52] U.S. Cl. .............................................. 395/109; 358/521
[58] Field of Search ........................... 395/109; 358/504, 358/518, 521, 406, 455, 519; 382/167

[56] References Cited

U.S. PATENT DOCUMENTS 5,585,927 12/1996 Fukui et al. ............................ 358/521
5,589,954 12/1996 Watanabe ............................... 358/521
5,754,683 5/1998 Hayashi et al. ........................ 358/521

*Primary Examiner*—Scott Rogers
*Attorney, Agent, or Firm*—Beverudge, DeGrandi, Weilacher & Young, LLP

[57] ABSTRACT

Method of automating at least a portion of an output gradation adjustment job for an image output apparatus. Test image data are corrected according to an initial gradation correction curve, and a test image is formed according to the image data thus corrected. The test image is read by a scanner to obtain read data. Based on the read data thus obtained, test image data are newly formed. Based on the newly formed test image data, a test image is again formed. The second-time test image thus formed is read by the scanner to obtain read data. Based on the read data obtained by reading the second-time test image, the initial gradation correction curve and a predetermined reference output curve, candidate point data are obtained. Based on the candidate point data, a gradation correction curve is formed and set.

14 Claims, 16 Drawing Sheets

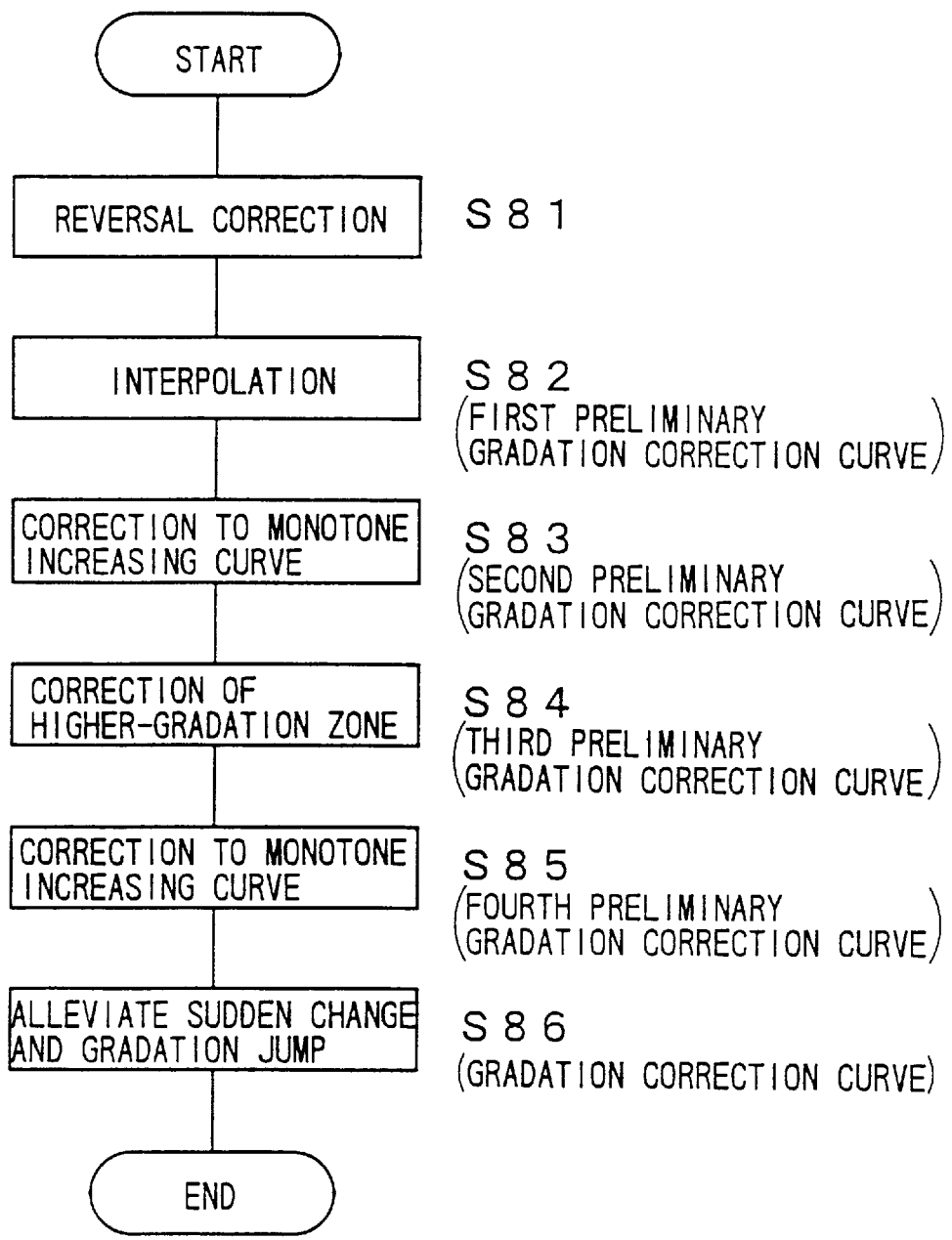

F I G. 11A
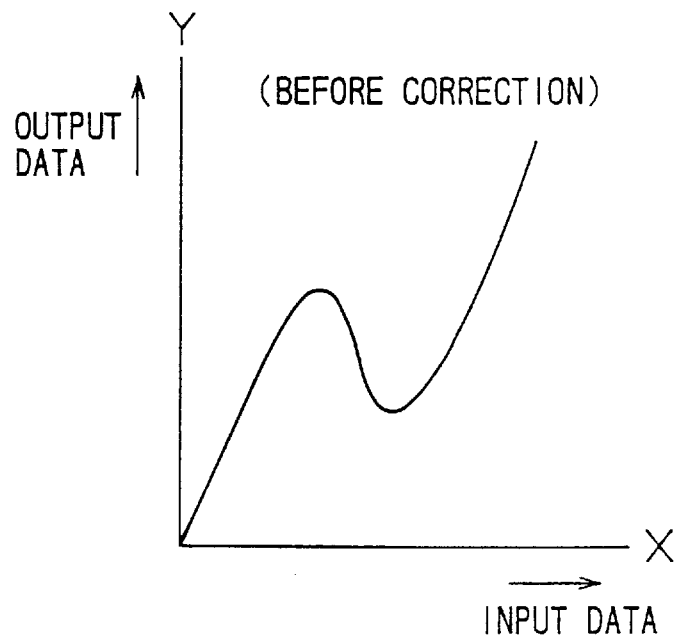
F I G. 11B
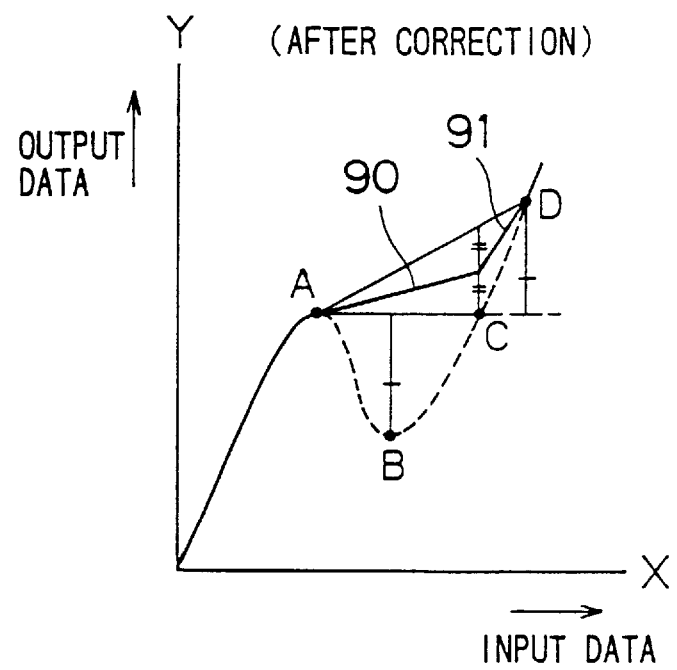

F I G. 12A
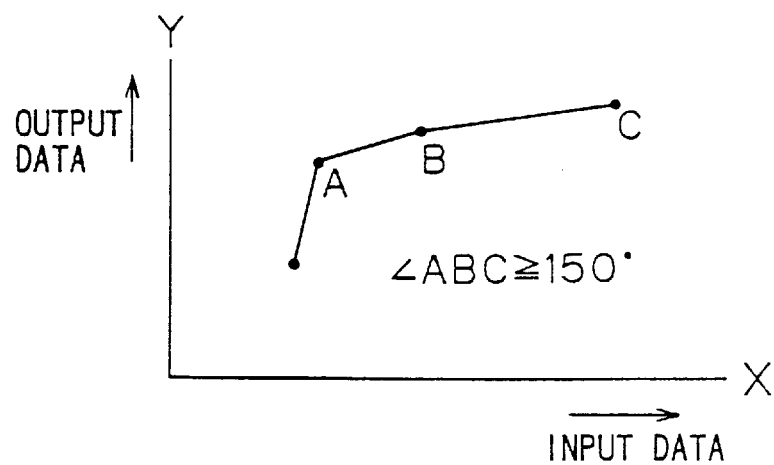
F I G. 12B
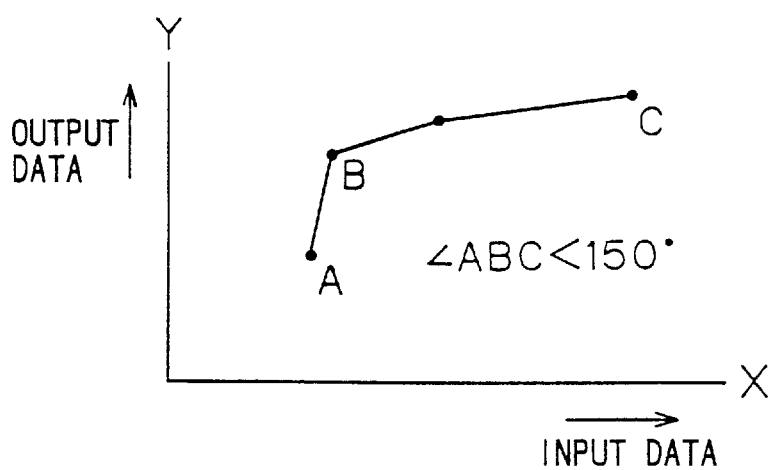
F I G. 12C
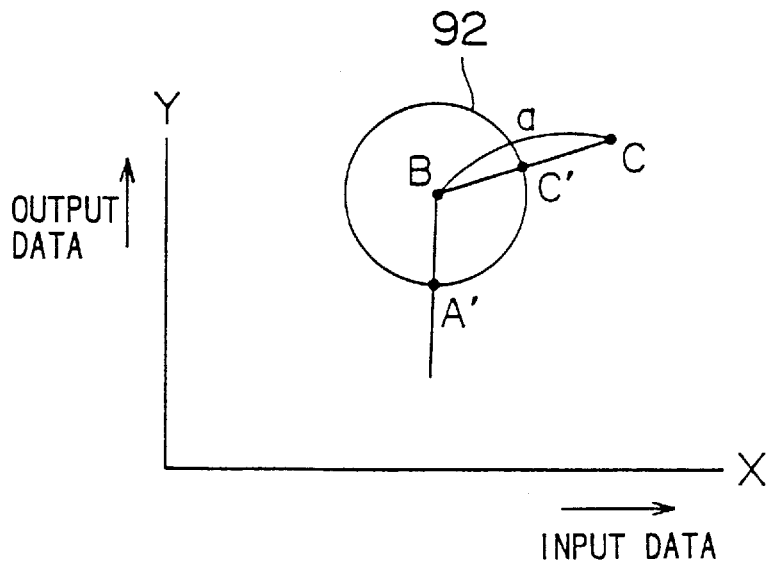

F I G. 13A
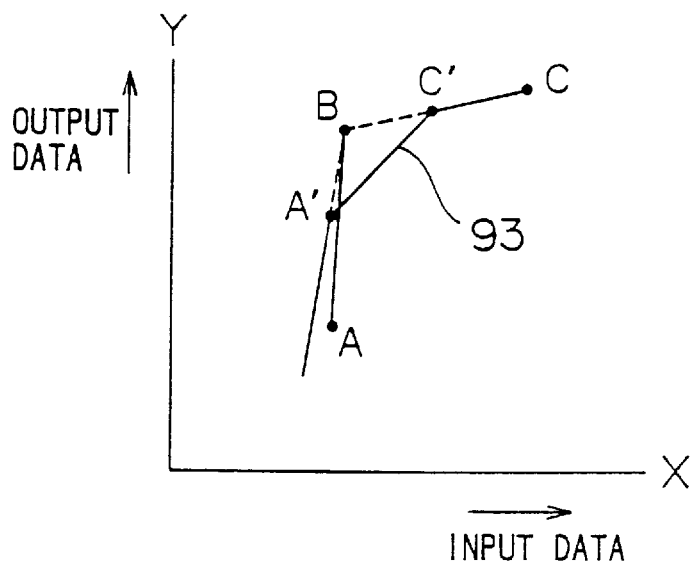
F I G. 13B
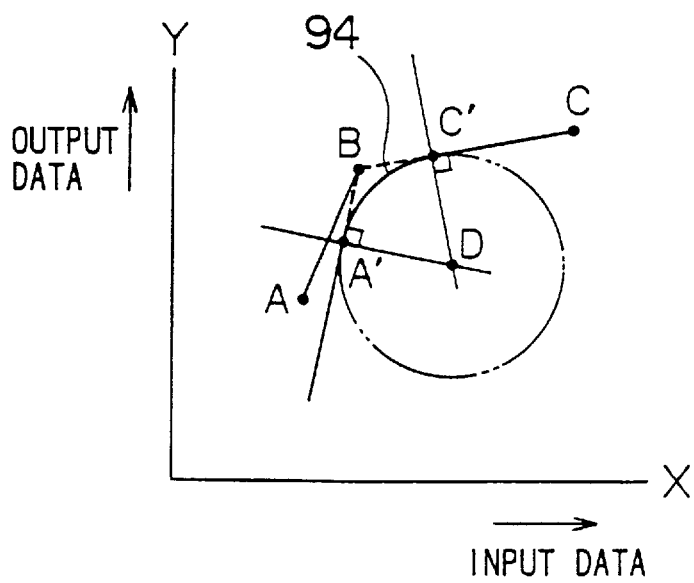

F I G. 14A
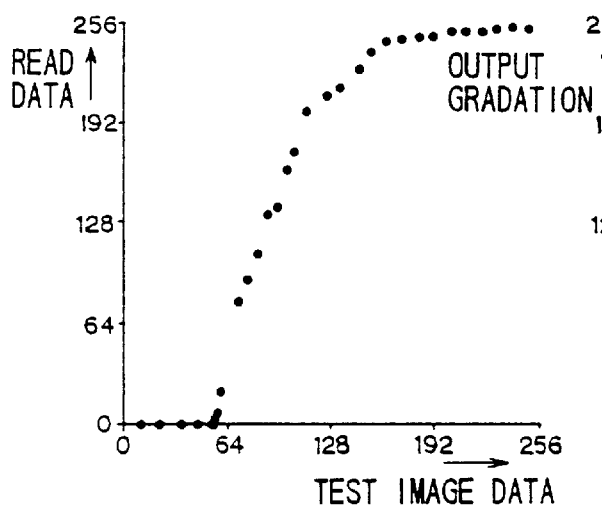
F I G. 14C
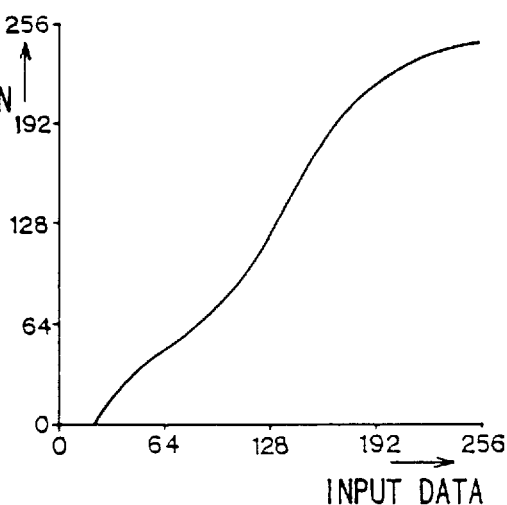
F I G. 14B
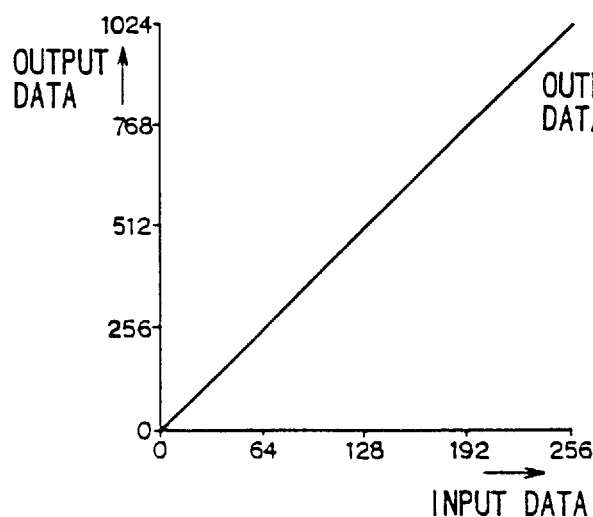
F I G. 14D
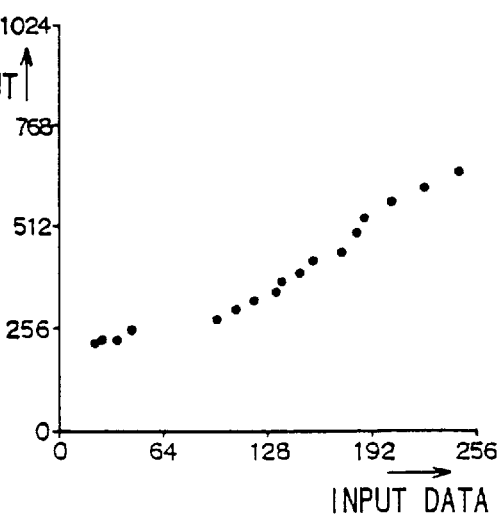

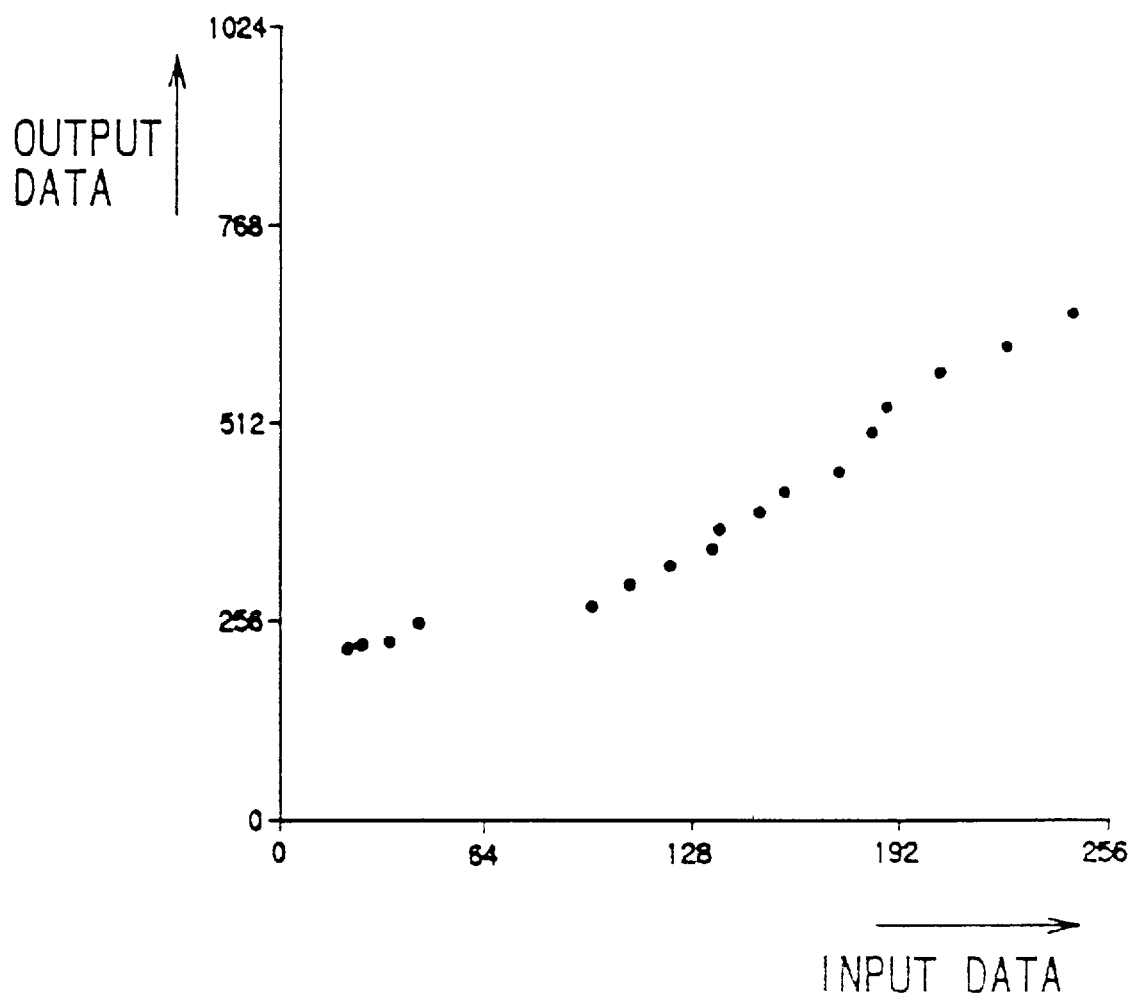
F I G. 15A

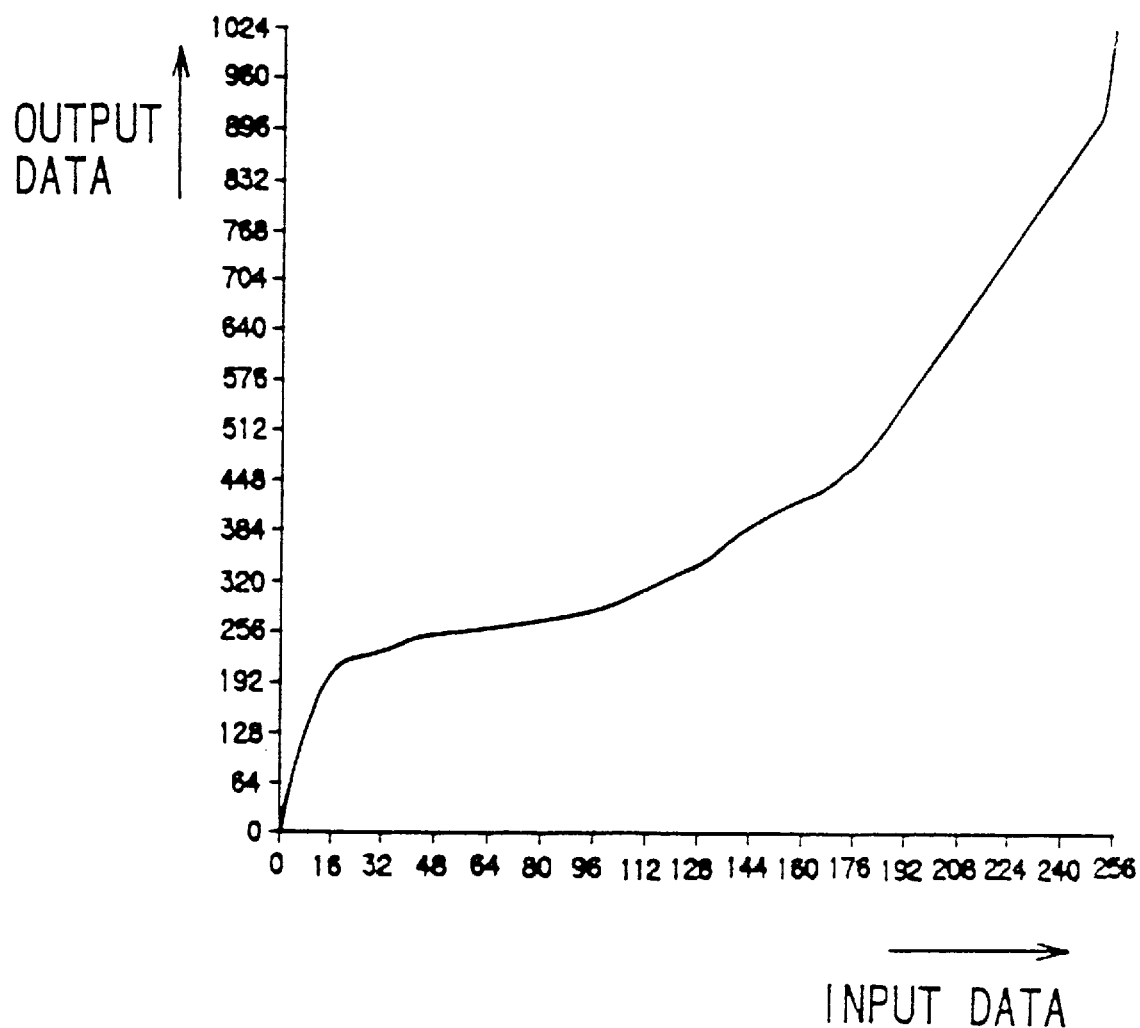
F I G. 15B

OUTPUT GRADATION ADJUSTMENT METHOD IN IMAGE OUTPUT APPARATUS

BACKGROUND OF THE INVENTION

1. Field of the Invention

The present invention relates to a method of adjusting the output gradations of an image output apparatus such as an image forming apparatus for forming an image based on image data indicative of the gradations of pixel depths or densities. The present invention also relates to an image output apparatus having an arrangement for automatically adjusting the output gradations. Further, the present invention relates to a method of forming a gradation correction curve to be used in image output apparatuses of the type above-mentioned.

2. Description of the Related Art

Conventionally, there is used a digital color copying machine in which a color document is optically read by a CCD (charge coupled device) scanner or the like and the data thus read are converted into the three primary color signals formed using an additive process of red (R), green (G) and blue (B) and in which, based on the signals thus formed, a color reproduction image of the document is formed. The three primary color signals of R, G and B supplied from the scanner are converted into the three primary color data formed using a subtractive process of cyanogen (C), magenta (M) and yellow (Y) which are respectively the complementary colors of red, green and blue. Each of the three primary color data is an 8-bit data in 256 gradations and indicative of the densities of each color component. Based on the three primary color data of C, M and Y, a black (BK) data is formed.

For example, the surface of a photoreceptor is scanned by a laser beam which is modulated based on the C data, and an electrostatic latent image corresponding to cyanogen is formed on the photoreceptor surface. This electrostatic latent image is developed into a toner image with the use of cyanogen toner, and this toner image is transferred onto a copying paper sheet. Likewise, for the M-, Y- and BK- data, toners of magenta, yellow and black are overlappingly transferred onto this paper sheet, and the toners are finally heated and fixed, thus forming a color copied image.

In view of the nature of a copying machine, an original image can readily be compared with a reproduced image and the demands for the reproducibility are therefore strict. However, a plurality of copying machines individually differ in development characteristics and photoreceptor sensitivity characteristics from one another. Further, the development characteristics vary with the colors of cyanogen, magenta, yellow and black. To faithfully reproduce the colors of an original image, therefore, each copying machine is required to be adjusted for each of the toners in four different colors.

Generally, such adjustment is made by copying a standard color document having an image in standard colors, and by visually comparing the reproduction with the standard color document. Then, there are formed gradation correction curves for correcting the gradations of cyanogen, magenta, yellow and black, respectively, and tables respectively corresponding to these curves are stored in a memory with back-up means in the copying machine.

In such so-called manual adjustment, the adjustment job is troublesome and takes much time. Further, after adjustment, there may possibly be produced variations of output image due to differences among individuals in charge of adjustment.

It is therefore proposed to form gradation correction curves using a data processing unit. However, each of the gradation correction curves is generally a complicated curve which can only be approximated by a curve of the three degree or higher. This disadvantageously causes the calculation to be complicated, requiring a long period of time for forming the gradation correction curves.

SUMMARY OF THE INVENTION

It is a first object of the present invention to provide an output gradation adjusting method capable of automating at least a portion of the output gradation adjustment operation for an image forming apparatus.

It is a second object of the present invention to provide an image output apparatus having an arrangement for automatically adjusting the output gradations.

It is a third object of the present invention to provide a gradation correction curve forming method capable of automatically forming a gradation correction curve using a simple processing to be completed in a short period of time.

According to the output gradation adjusting method of the present invention, a test image is formed based on test image data with initial gradation correction curve data set. Optical reading means reads the test image, thus obtaining read data corresponding to the test image data. The relationship in correspondence between the test image data and the read data is exactly equivalent to the input/output characteristics of the image output apparatus to which the initial gradation correction curve data have been set. In this connection, based on the read data, the initial gradation correction curve data and reference output curve data, new gradation correction curve data are operated, thus obtaining the gradation correction curve data matched to the input/output characteristics of the image output apparatus. The gradation correction curve data thus obtained are set to the image output apparatus, thus completing the adjustment of output gradations for the image output apparatus.

The operation of the gradation correction curve data based on the read data, the initial gradation correction curve data and the reference output curve data, can be automated using a data operation processing. It is therefore possible to automate the majority portion of the output gradation adjusting job for the image output apparatus. Further, since the gradation correction curve data are operated based on the read data, the initial gradation correction curve data and the reference output curve data, this prevents the adjustment from varying dependent on the person in charge of adjustment. Thus, the output gradations of the image output apparatus can securely be adjusted to the optimum state.

Accordingly, the output gradation adjustment job can be completed in a short period of time and the image output apparatus can securely be adjusted to a proper state regardless of the degree of skill of the person in charge of adjustment.

According to an embodiment of the present invention, two test images are formed. The first-time test image is formed based on predetermined test image data. Presumed based on the first-time test image is a zero-point input data which corresponds to the depth or density value of the ground part of the test image.

There are instances where, dependent on the input/output characteristics of the image output apparatus, there is formed an image low in depth or density for an image data of which value is relatively small. Accordingly, significant read data cannot be obtained for the data presenting small values out of the first-time test data.

In this connection, the zero-point input data is presumed, and there is formed a set of test image data with a value in the vicinity of the zero-point input data serving as the minimum value. Accordingly, when a test image is formed again based on the new test image data and this second-time test image is read by optical reading means to obtain read data, each of the read data has a significant value. When the read data thus obtained are used together with the read data of the first-time test image, the number of the significant read data is increased. Thus, there can be obtained more suitable gradation correction curve data.

Thus, based on the read data of the first-time test image, test image data for forming the second-time test image are formed within the range where significant read data can be obtained. As a result, a large number of significant read data can be used for operating the gradation correction curve data. Accordingly, more suitable gradation correction curve data are operated, thus increasing the output gradation adjustment processing in accuracy.

To successfully represent gradations in the lower-gradation zone, a set of the second-time test image data preferably contains a large number of data corresponding to the lower-gradation zone.

According to the gradation correction curve forming method of the present invention, the image output apparatus is arranged to supply a predetermined test image and there are obtained, based on the output result, candidate points to be placed on the gradation correction curve. A reversal correction is made on a candidate point, if any, where the relationship in size between output image data is reverse to the relationship in size between input image data.

A candidate point is represented by a set of (i) an input image data corresponding to the data before gradation correction made using the gradation correction curve and (ii) an output image data corresponding to the data after gradation correction. Accordingly, the reversal correction is achieved, for example, by correcting the output image data of the candidate point.

Based on the candidate points for which the reversal correction has been made, the gradation correction curve is formed. This corrects the gradation correction curve to a monotone increasing curve. Since there must be formed an image higher in depth or density as the input image data is greater in value, it is very important to correct the gradation correction curve to a monotone increasing curve.

For example, the reversal correction may be made in the following manner. That is, a plurality of candidate points are successively determined, as observation points, in the order of the values of the output image data starting with the smallest one. When the output image data of an observation point is smaller than the output image data of the candidate point immediately before the observation point, the output image data of the observation point is corrected to a value between the output image data of the candidate points immediately before and after the observation point. When the output image data of an observation point is not less than the output image data of the candidate point immediately after the observation point, the output image data of the observation point is decreased provided that the output image data of the observation point is smaller than the output image data of the corresponding point on the straight line connecting the candidate point immediately before the observation point to the candidate point immediately before this candidate point immediately before the observation point.

According to an embodiment of the present invention, the zone between candidate points is interpolated using a straight line, a quadratic curve and a curve formed by referring to a quadratic curve. This does not requires, in order to interpolate the zone between candidate points, any operation relating to a curve of the three degree or higher. Accordingly, when executing an interpolation processing using a data processing unit, no complicated processing is required, enabling the gradation correction curve to be formed in a short period of time.

The interpolating processing may be executed, for example, by interpolating the zone between the origin and the candidate point next thereto using a quadratic curve, by interpolating the zone among three candidate points using a straight line when the angle formed by two line segments each connecting two candidate points out of the three candidate points, is not less than a predetermined angle, and by interpolating the zone among three candidate points, referring to (i) a quadratic curve passing through the three candidate points and (ii) a quadratic curve passing through two candidate points out of the three candidate points and another candidate point, using a curve passing between the two quadratic curves above-mentioned, when the angle formed by two line segments each connecting two candidate points out of the three candidate points, is smaller than a predetermined angle.

There are instances where the curve formed by the interpolation processing above-mentioned contains a portion which is not a monotone increasing curve. It is therefore preferable to correct such a portion to a monotone increasing curve.

Further, there are instances where the curve formed by interpolating the zone between candidate points, contains, in a higher-gradation zone, a portion of which inclination undergoes a sudden change. Preferably, such a portion in the higher-gradation zone of which change in inclination is not less than a predetermined value, is corrected to a straight line or a circular arc to alleviate the change in inclination. This eliminates a portion where the ratio in change of output image data to input image data undergoes a sudden change. Thus, an intermediate-gradation image or the like can be represented in higher quality.

Further, since a straight line or a circular arc is used to alleviate such a sudden change in inclination, the processing is relatively simple. Accordingly, the processing does not take much time even though it is executed using a data processing unit.

There are instances where such a correction in a higher-gradation zone causes the curve to contain a portion which is not a monotone increasing curve. It is therefore more preferable to correct the curve formed through the correction in a higher-gradation zone, to a monotone increasing curve.

The processing of correction to a monotone increasing curve may for example be achieved by a method comprising the steps of: searching a maximal point in the curve to be processed; searching the minimal point subsequent to the maximal point; searching, subsequent to the search of the minimal point, that point on the curve to be processed of which output image data is equal to the output image data of the maximal point, the point thus searched being set as a first point; searching, subsequent to the search of the first point, that point on the curve to be processed of which output image data is greater, by the difference in output image data between the maximal and minimal points, than the output image data of the first point, the point thus searched being set as a second point; correcting the curve to be processed at its portion between the maximal point and the first point, to a straight line which passes through the maximal point and of which output image data are gradually increased with an increase in input image data; and correcting the curve to be processed at its portion between the first and second points, to a curve which passes between the straight line connecting the maximal point to the second point and the curve to be processed and which is connected to a straight line passing through the maximal point.

Further, when the gradation correction curve is corrected such that any change in inclination thereof is smaller than a predetermined value, the gradation correction curve contains no portion of which inclination undergoes a sudden change. This achieves a high-quality representation of an image.

According to the present invention having the arrangement above-mentioned, with the use of a data processing unit, a simple processing can achieve, in a short period of time, the reversal correction, the interpolation, the correction in a higher-gradation zone and the correction to a monotone increasing curve for forming the gradation correction curve based on the candidate points obtained from the output results of a test image. This enables the formation of the gradation correction curve to be automated and to be completed in a short period of time.

Accordingly, much of the output gradation adjustment job for the image output apparatus can be automated and the adjustment can be completed in a short period of time. Further, when the gradation correction curve is automatically formed using a data processing unit, the suitable gradation correction curve can securely be formed regardless of the degree of skill of the person in charge of adjustment.

These and other features, objects and advantages of the present invention will be more fully apparent from the following detailed description set forth below when taken in conjunction with the accompanying drawings.

BRIEF DESCRIPTION OF THE DRAWINGS

FIG. 7 is a flow chart illustrating the flow of a processing for forming gradation correction curve data based on the candidate point data;

FIGS. 11A and 11B illustrate a processing of correction to a monotone increasing curve;

FIGS. 12A, 12B and 12C illustrate a processing of correction in a higher-gradation zone;

FIGS. 13A and 13B illustrate a processing of correction in a higher-gradation zone;

FIGS. 14A, 14B, 14C and 14D illustrate an example of forming a gradation correction curve; and FIGS. 15A and 15B illustrate an example of forming a gradation correction curve.

DETAILED DESCRIPTION OF PREFERRED EMBODIMENTS

1. Inside Arrangement of Digital Color Copying Machine

Figure 1:
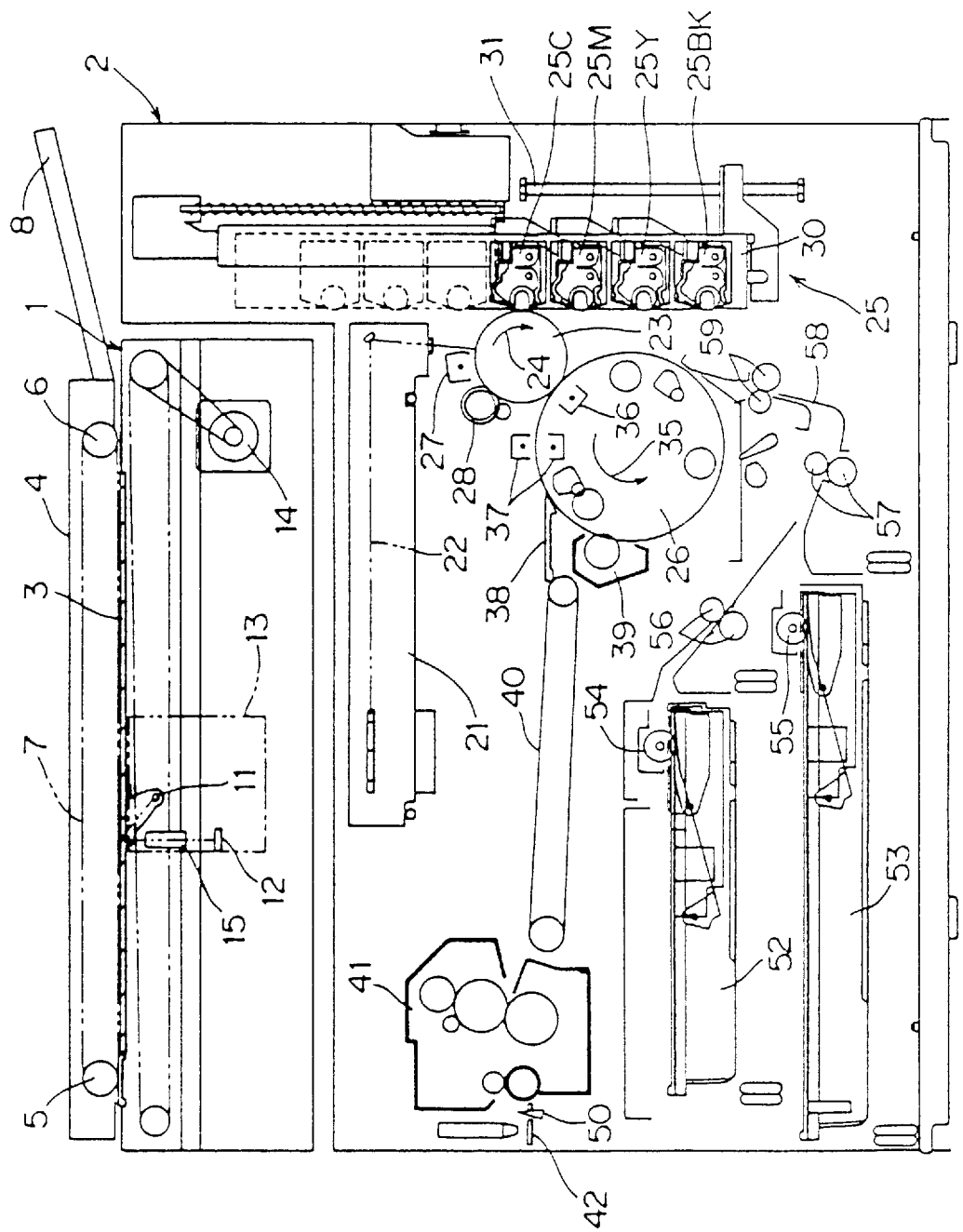
FIG. 1 is a schematic section view illustrating the inside arrangement of a color digital copying machine to which an embodiment of the present invention is applied.

FIG. 1 is a schematic section view illustrating the inside arrangement of a digital color copying machine to which an embodiment of the present invention is applied. This color copying machine has a scanner unit 1 serving as optical reading means for reading a document, and a printer unit 2 serving as image output means for processing the signals from the scanner unit 1 to form a color image. Disposed at the top of the scanner unit 1 is a transparent plate 3 on which a document is to be set. An automatic document feed device 4 is disposed on the transparent plate 3. The automatic document feed device 4 has a pair of drive rollers 5, 6, and an endless belt 7 wound on the pair of drive rollers 5, 6. The automatic document feed device 4 is arranged to feed, one by one, a plurality of documents (not shown) set on a document tray 8 to the transparent plate 3, causing each document to be set at a predetermined position.

Disposed under the transparent plate 3 is a scanning and reading unit 13 having a light source 11 and a one-dimensional CCD (charge coupled device) image sensor 12. The scanning and reading unit 13 is arranged to be reciprocally displaced along the transparent plate 3 when driven by an optical motor 14. This causes the document placed on the transparent plate 3 to be illuminated and scanned. In the course of illumination and scanning, light generated from the light source 11 is reflected from the document surface, and the reflected light is incident upon the image sensor 12 through a lens 15. As a result, outputs of the image sensor 12 supplied in time series serve as signals indicative of an image formed on the document surface.

The color image sensor 12 supplies three primary color signals of red, green and blue. The signals are converted into digital data by an analog/digital converter (not shown) provided in the scanner unit 1. The digital data thus converted are further converted into C-, M- and Y-data corresponding to cyanogen (C), magenta (M) and yellow (Y) which are the three primary colors in the subtractive process. Each of these data is an 8-bit data, for example. Accordingly, each of C-, M- and Y-data represents the density of each color component of each pixel in 256 gradations.

The C-, M- and Y-data are supplied to the printer unit 2. In the printer unit 2, a predetermined processing is executed on the C-, M- and Y-data and, in addition to the three primary color data, BK-data corresponding to black are formed. Video signals respectively corresponding to the C-, M-, Y- and BK-data are formed and supplied to a laser scanning unit 21 in this order.

Laser light 22 generated from the laser scanning unit 21 is guided to a regular cylindrical photoreceptor 23, causing the same to be exposed to the laser light 22. The photoreceptor 23 is rotated around its axis in a direction shown by an arrow 24, and the surface of the photoreceptor 23 before light exposure, is uniformly electrically charged by a charging device 27. Thus, there is formed, on the surface of the photoreceptor 23 exposed to the laser light 22, an electrostatic latent image corresponding to the modulation applied to the laser light 22.

This electrostatic latent image is developed into a toner image by a developing unit 25, and the toner image is transferred to a copying paper sheet wound on a regular cylindrical transferring drum 26 disposed in the vicinity of the surface of the photoreceptor 23. That portion of the photoreceptor 23 surface from which the toner image has been transferred, is cleaned by a cleaning device 28.

The developing unit 25 has a holding body 30 and an elevating mechanism 31. In the holding body 30, development cartridges 25C, 25M, 25Y, 25BK respectively containing toners of cyanogen, magenta, yellow and black are held as arranged in this order from the top. The elevating mechanism 31 is disposed for vertically moving the holding body 30. According to the arrangement above-mentioned, the development cartridges 25C, 25M, 25Y, 25BK are switchingly selected as corresponding to the video signals of C, M, Y and BK supplied to the laser scanning unit 21, and come into contact with the photoreceptor 23. Thus, the toner images of cyanogen, magenta, yellow and black are successively formed on the surface of the photoreceptor 23.

The transferring drum 26 is rotationally driven around its axis in a direction shown by an arrow 35 such that the peripheral speed of the transferring drum 26 is equal to that of the photoreceptor 23. Disposed inside of the transferring drum 26 is a transferring device 36 for transferring, by high-frequency discharge, the toner on the surface of the photoreceptor 23 to the copying paper sheet wound on the transferring drum 26. Disposed downstream of the transferring device 36 in the rotation direction of the transferring drum 26 are a pair of separating devices 37 for facilitating the separation of the copying paper sheet by corona discharge. Disposed downstream of the separating devices 37 is a separating pawl 38 for separating, from the transferring drum 26, the copying paper sheet to which the toner image has been transferred.

Further disposed around the transferring drum 26 is a cleaning device 39 for cleaning that surface of the transferring drum 26 from which the copying paper sheet has been separated. The separating pawl 38 and the cleaning device 39 are movable into contact with and apart from the transferring drum 26.

The copying paper sheet separated from the transferring drum 26 by the separating pawl 38, is conveyed and guided, by a delivery unit 40, to a fixing unit 41 where the toner image on the paper sheet surface is fixed. The copying paper sheet on which toner image has been fixed, is discharged to the outside of the copying machine through a paper discharge passage 42.

Copying paper sheets are stacked in cassettes 52, 53 and are arranged to be drawn out by sheet feed rollers 54, 55 and to be guided to a delivery passage 58 by delivery rollers 56, 57. The paper sheet is finely adjusted in feed timing by registration rollers 59 in the vicinity of the transferring drum 26, and then fed to the transferring drum 26. The copying paper sheet thus fed, is held by a clip mechanism (not shown) and wound on the transferring drum 26 with the rotation thereof.

The copying paper sheet wound on the transferring drum 26 is held at the surface thereof before completion of the transfer of the toner images of cyanogen, magenta, yellow and black. While the toner images of cyanogen, magenta, yellow and black are being formed on the copying paper sheet, the separating pawl 38 and the cleaning device 39 are retreated to positions separated from the transferring drum 26. When the toner images of the three colors have been transferred to the copying paper sheet, the separating pawl 38 and the cleaning device 39 come in contact with the transferring drum 26 and corona discharge starts at the separating devices 37.

When the tip of the copying paper sheet to which the toner image of black as the fourth color has been transferred, reaches the separating pawl 38, the paper holding state by the clip mechanism is released. Then, the copying paper sheet separated by the separating pawl 38 is conveyed and guided to the fixing unit 41 by the delivery unit 40.

It is a matter of course that when reproduction in monochrome is to be made using single color toner, the separating pawl 38 and the cleaning device 39 are brought into contact with the transferring drum 26 from the beginning and a copying paper sheet does not reach the cleaning device 39.

2. Electric Arrangement of the Digital Color Copying Machine

Figure 2:
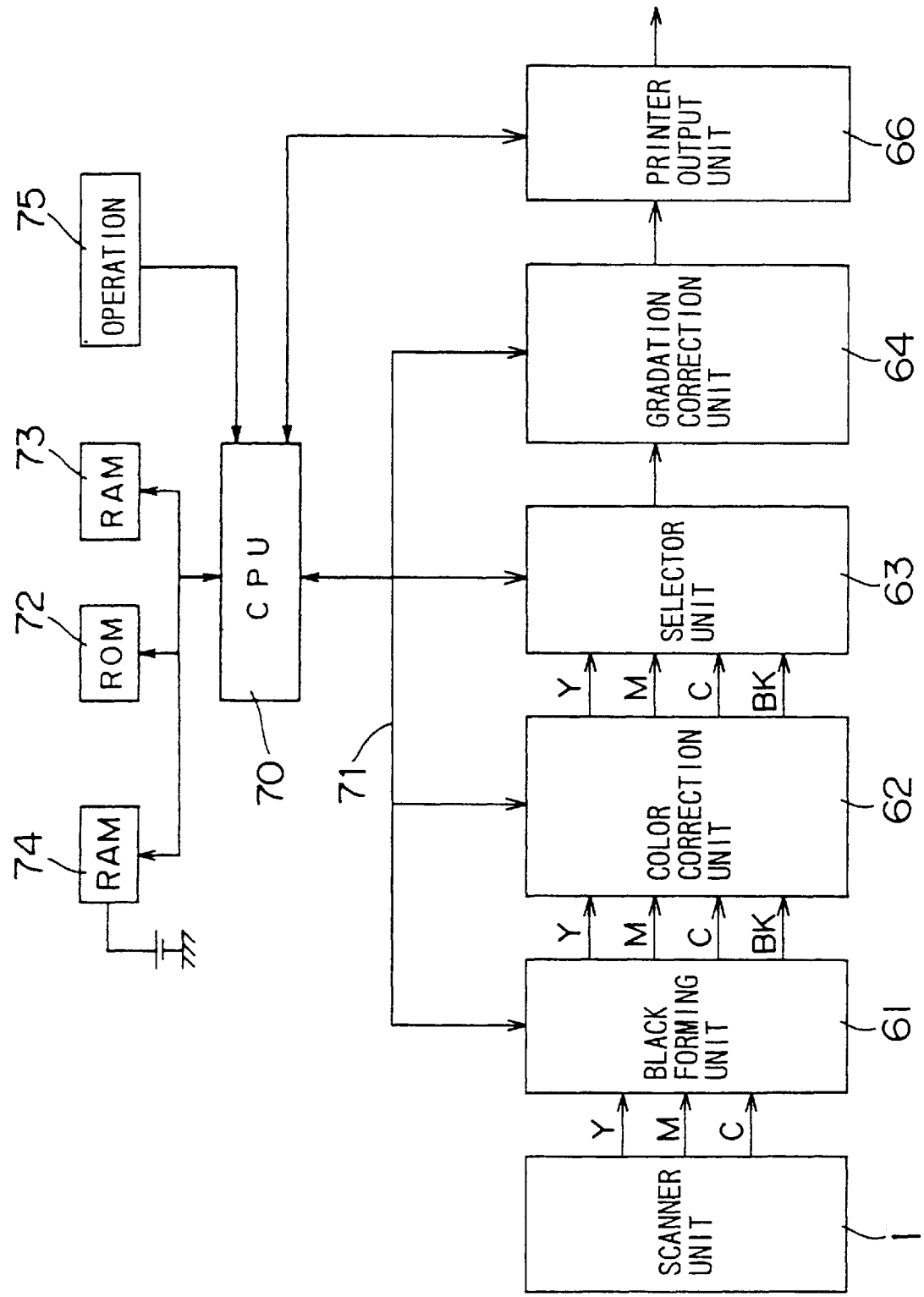
FIG. 2 is a block diagram illustrating the electric arrangement of the main portion of the color digital copying machine in FIG. 1.

FIG. 2 is a block diagram illustrating the electric arrangement of the main portion of the color copying machine above-mentioned. The scanner unit 1 generates three primary color data of C, M and Y. These data are supplied to a black forming unit 61 where the C-, M- and Y-data are corrected and BK-data corresponding to black toner are generated.

The C-, M-, Y- and BK-data are subjected to a so-called masking processing at a color correction unit 62 and then supplied to a selector unit 63. The selector unit 63 selects single color-data, out of the C-, M-, Y- and BK-data, corresponding to a signal to be supplied to the laser scanning unit 21 and supplies the data thus selected to a gradation correction unit 64. In the gradation correction unit 64, a gradation correction is made for each color according to the sensitivity characteristics of the photoreceptor 23 and the development characteristics of the developing unit 25. That is, data for each color are individually increased or decreased.

The data after subjected to a gradation correction are supplied to a printer output unit 66 for forming signals to be supplied to the laser scanning unit 21 above-mentioned.

The control and operation of the respective units are conducted by a CPU (central processing unit) 70. The CPU 70 is connected to a bus 71 which is connected to the black forming unit 61, the color correction unit 62, the selector unit 63 and the gradation correction unit 64. Connected to the CPU 70 are a ROM 72 containing operational programs and the like, a RAM 73 used as a work area and a RAM 74 with a back-up power source arranged to store gradation correction curve data indicative of gradation correction curves. A gradation correction curve is to be referred to by the gradation correction unit 64 when executing a gradation correction processing, and represents the relationship between the input gradations from the selector unit 63 and the output gradations to be supplied to the printer output unit 66. It is an output gradation adjustment processing that properly sets the data of such a gradation correction curve. The processing to be executed by the gradation correction unit 64 is actually achieved by a software processing that the CPU 70 executes by referring to gradation correction curves in the RAM 74.

Further entered into the CPU 70 are signals from an operation unit 75 disposed, for example, on the top of the scanner unit 1. An adjustment mode key (not shown) is disposed on the operation unit 75. When this adjustment mode key is operated, the sequence proceeds to the adjustment mode for forming gradation correction curve data.

In the adjustment mode, four different test data respectively corresponding to the four colors of C, M, Y and BK are supplied to the printer output unit 66, and four image forming operations are executed in a tentative way. This produces a test image for each of the colors.

3. Test Image Used for Output Gradation Adjustment

Figure 3:
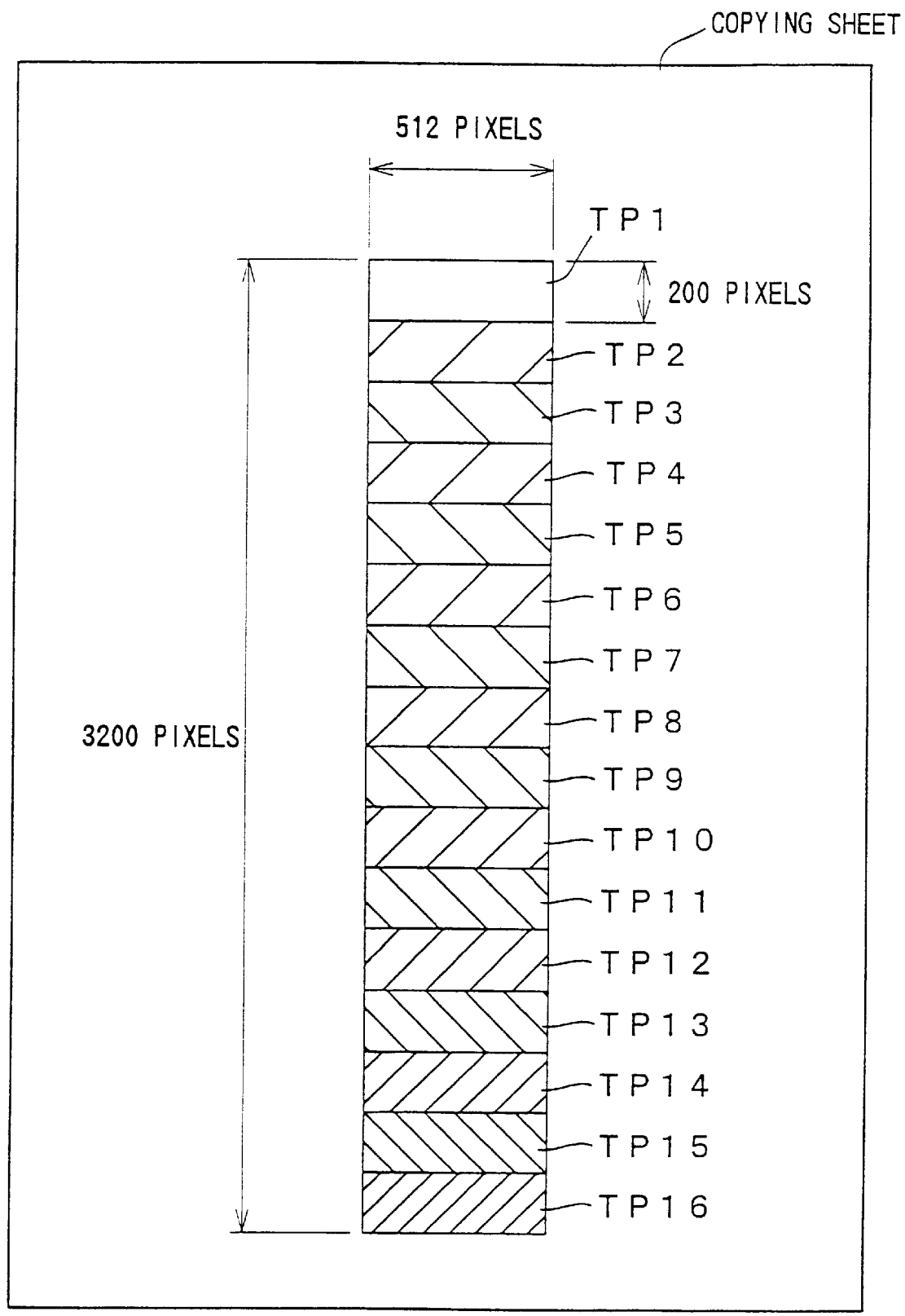
FIG. 3 shows an example of a test image.

FIG. 3 shows an example of a test image formed for adjustment of output gradations. For example, the adjustment of output gradations is made successively for each of the four colors of cyanogen, magenta, yellow and black. In this connection, a gray scale in 16 stages is formed for each color to be adjusted in gradation. More specifically, there are formed 16 rectangular zones TP1, TP2, ..., TP16 in which color depth (toner density) is increased by stages. Each rectangular zone is composed of, for example, 200 pixels in length and 512 pixels in width, and the pixels in one rectangular zone are formed based on the same data. In FIG. 3, the color depth of each zone is represented by the density of oblique lines.

4. Output Gradation Adjustment Processing

Figure 4:
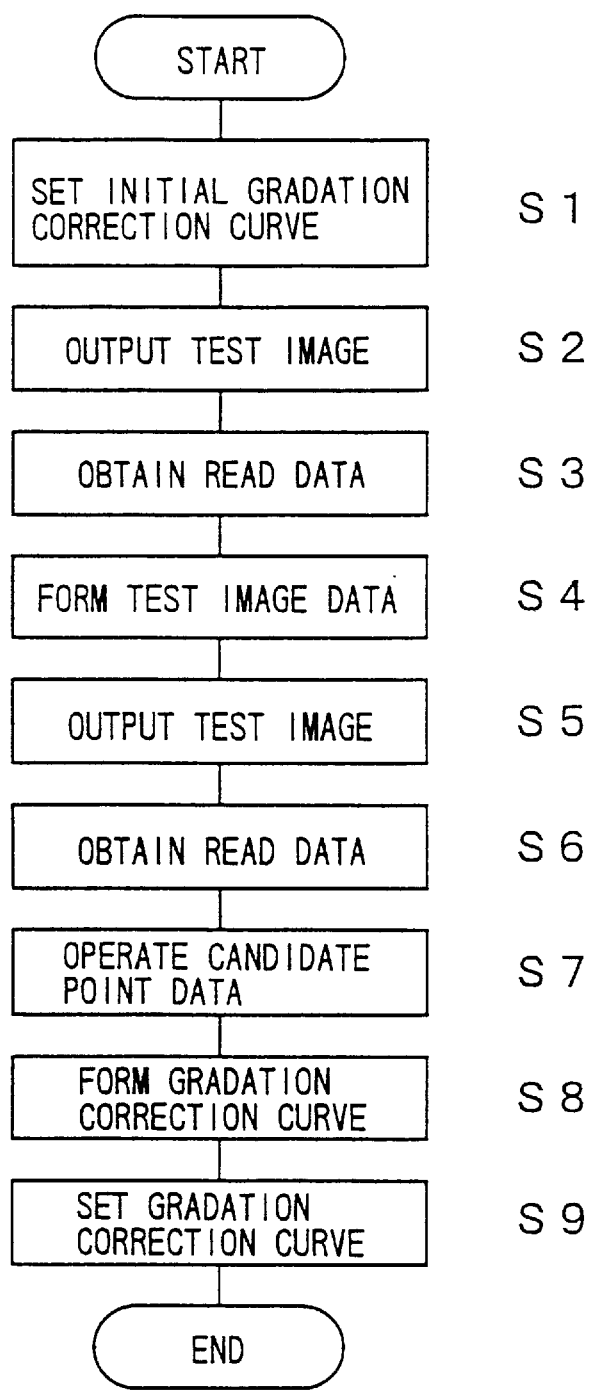
FIG. 4 is a flow chart illustrating the flow of an output gradation adjustment processing.
Figure 5:
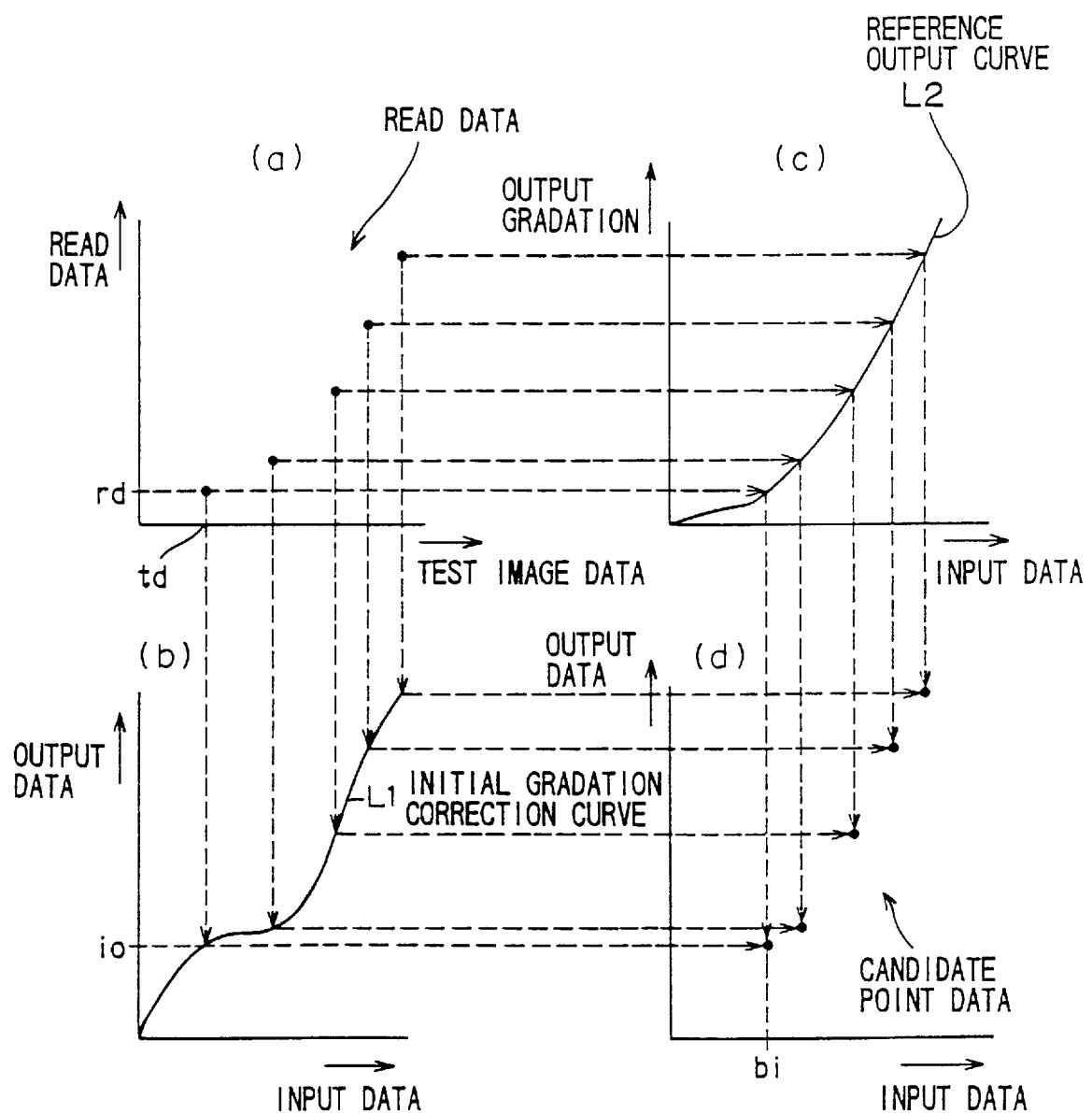
FIG. 5 shows the principle of forming a gradation correction curve.

FIG. 4 is a flow chart illustrating the output gradation adjustment processing, while FIG. 5 illustrates the principle of the output gradation adjustment processing. The output gradation adjustment processing is achieved by setting proper gradation correction curve data to the RAM 74. More specifically, the input/output characteristics (gradation correction curves) of the gradation correction unit 64 are determined such that the depths or densities of the image read by the scanner unit 1 are properly reproduced in the image supplied by the printer unit 2.

As gradation correction curve data to be referred to by the gradation correction unit 64, initial gradation correction curve data corresponding to an initial gradation correction curve L1 shown in FIG. 5(b) are set to the RAM 74 (step S1). As the initial output gradation correction curve data, there may be set, for example, data corresponding to a linear straight line along which input data and output data are in proportion to each other, or there may also be adopted gradation correction curve data which are being set at the time when adjustment is to be made. It is considered preferable that in adjustment of a copying machine at the production stage, a straight line along which input and output data are proportional to each other, is adopted as the initial gradation correction curve and that in adjustment of the copying machine at the time of maintenance by a service personnel, the gradation correction curve which is being set at that time, is adopted as the initial gradation correction curve.

Then, the CPU 70 reads out test image data previously stored in the ROM 72 and enters the test image data thus read, to the gradation correction unit 64. As a result, a test image as shown in FIG. 3 is formed on a copying paper sheet (step S2). For example, when an 8-bit input image data represents the depth in 256 gradations, the test image data are preferably discrete extending over almost all gradation sections; an exemplary set of such test image data is {10, 22, 34, 46, 58, 70, 82, 94, 106, 144, 163, 182, 201, 220, 239}. The test image is a monochromatic gray scale. However, it is preferable to execute transferring operations using toners of cyanogen, magenta, yellow and black as done in color copying. This is because the depths or densities of an image, even in monochrome, obtained through one transferring operation are different from those of the image obtained through four transferring operations. By executing four transferring operations, there may be obtained a reproduction near to that obtained when the copying machine is actually used. Also, provision may be made such that test images of cyanogen, magenta, yellow and black are simultaneously formed on a single paper sheet at its different zones.

The test image thus formed is placed on the transparent plate 3 at the top of the copying machine body 1 and is read under the action of the scanner unit 1 (step S3). As a result, read data respectively corresponding to the test image data are obtained as shown in FIG. 5(a). For example, there may be taken, as the read data, the average of a plurality of pixel data in a regular square zone of 16 pixels×16 pixels in each rectangular zone TPi (i=1, 2, 3 ..., 16) of the test pattern image in FIG. 3. This eliminates the influence of depth or density variations of the pixels.

Next, to supply a test image again, test image data are newly formed (step S4). The newly formed test image data are different from the test image data used for forming the first-time test image. Using the newly formed test image data, a test image is output (step S5). Further, there are obtained read data of the test image at its portions respectively presenting different depths or densities (step S6). Thus, a large number of read data can be obtained by supplying two test images and reading the data thereof.

The obtained read data are then referred to reference output curve data corresponding to a reference output curve L2 shown in FIG. 5(c). The reference output curve L2 is a curve which represents the depth data to be originally obtained with respect to input data entered into the gradation correction unit 64. The data corresponding to the reference output curve L2 are previously stored in the ROM 72. In a copying machine for which the output gradation adjustment processing has been finished, when a test image is formed based on the test image data above-mentioned and then read by the scanner unit 1, the relationship between the test image data and the read data follows the reference output curve L2.

Based on the initial gradation correction curve data, the read data and the reference output curve data, the CPU 70 operates candidate point data based on which gradation correction curve data are to be formed (step S7). More specifically, there are determined candidate point data composed of pairs of input data and output data in which the input values of the reference output curve L2 corresponding to the read data serve as the input data and in which the output values of the initial gradation correction curve L1 corresponding to the test image data which in turn correspond to the read data, serve as the output data.

The candidate point data are as shown in FIG. 5(d). More specifically, the graph of the candidate point data is disposed under the graph of the reference output curve L2, the graph of the initial gradation correction curve L1 is disposed at the left side of the graph of the candidate point data, and the graph of the read data is disposed above the graph of the initial gradation correction curve L1. Then, straight lines are horizontally and vertically drawn from the read data points, and turned at right angles at the intersecting points where the horizontal and vertical straight lines respectively intersect the reference output curve L2 and the initial gradation correction curve L1, and the points where the turned vertical and horizontal lines intersect each other, are determined as candidate points.

For example, it is now supposed that the output value of the initial gradation correction curve L1 for a test image data td is io, and that the read data for the test image data td is rd. It is also supposed that the output gradation on the reference output curve L2 for the input gradation data bi, is rd. In this case, when the gradation correction unit 64 supplies an output data io for an input data bi, a pixel in gradation rd is faithfully supplied. Accordingly, when provision is made such that the output data io corresponds to the input data bi, this point serves as a candidate point which is to be located on the gradation correction curve.

Based on the candidate point data obtained in the manner above-mentioned, the CPU 70 executes, according to the predetermined programs in the ROM 72, interpolation of candidate points and adjustments such that the output data monotonously increase with an increase in input data and that changes in output data with respect to the input data are not sudden, thus forming gradation correction curve data (step S8).

Similar processings are executed for each of the four colors of cyanogen, magenta, yellow and black, and gradation correction curve data for the four colors are set in the RAM 74 (step S9), thus completing the output gradation adjustment processing. There are instances where the copying mode can be set to any of a character mode suitable for copying character images, a map mode suitable for copying map images, a photograph mode suitable for copying photograph images and a character/photograph mode suitable for copying images mixingly containing characters and photographs. In such a case, gradation correction curve data are preferably obtained for the four colors for each of the modes above-mentioned and set in the RAM 74. In such a case, a reference output curve for each of the four colors for each of the modes is previously stored in the ROM 72.

Figure 6A:
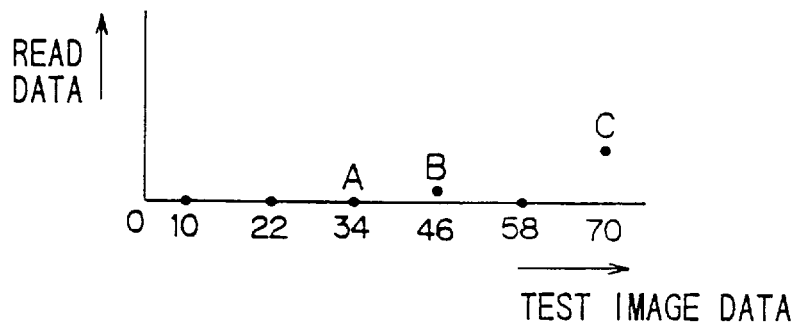
FIGS. 6A, 6B and 6C illustrate a processing for forming data for the second-time test image.
Figure 6B:
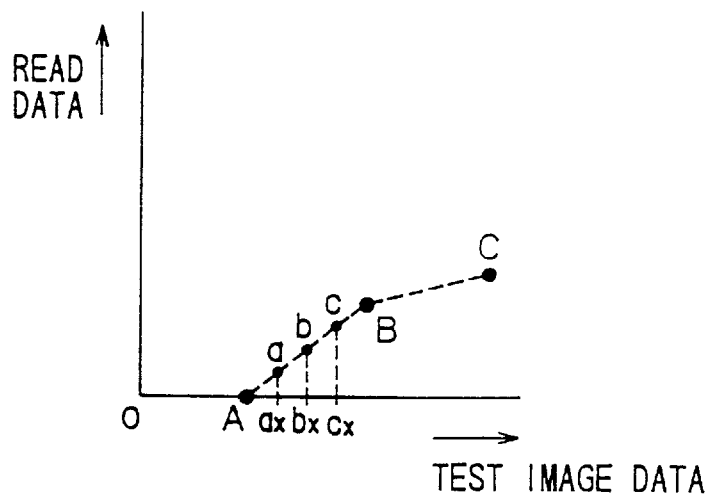
Figure 6C:
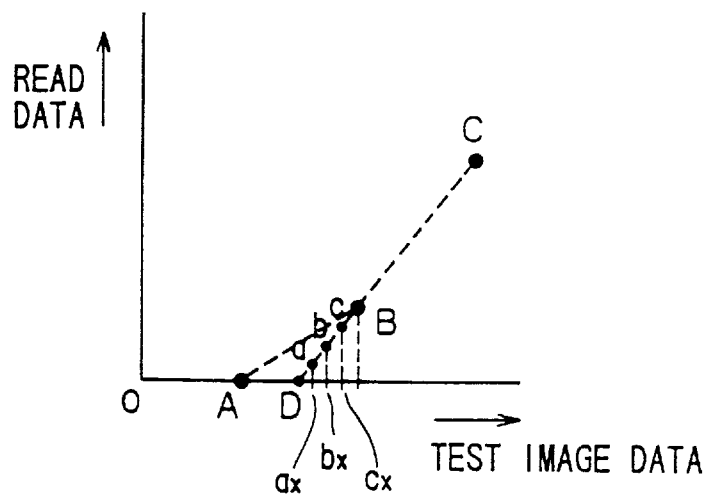

5. Formation of Data for the Second-Time Test Image FIGS. 6A, 6B and 6C illustrate a processing for forming test image data for the second-time test image. In forming the test image data, a zero-point input data is presumed. The zero-point input data refers to an image data corresponding to the depth or density of the ground part of the test image. The scanner unit 1 is arranged to supply the ground data for an input not greater than the zero-point input data. The ground data is obtained by sampling, at the time of reading the first-time test image, those outputs from the scanner unit 1 for the ground part of the test image.

In forming the first-time test image, the predetermined test image data stored in the ROM 72 are used. However, there are instances where, dependent on the characteristics of the photoreceptor 23 or toner, there cannot be formed an image sufficient in depth or density for an image data of which value is relatively small. Therefore, a zero-point input data presuming processing is executed based on the reading result of the first-time test image.

FIG. 6A illustrates the relationship between the test image data corresponding to the first-time test image, and the read data thereof. In this example, the outputs of the scanner unit 1 for the test image data "10", "22", "34" are equal to the ground data (=0), and the read data for the next test image data "46" is, for the first time, greater than the ground data. Accordingly, the zero-point input data is present between "34" and "46".

Thus, the CPU 70 forms test image data for forming the second-time test image according to the following procedures 1 to 3.

Procedure 1

The point where the read data is greater than the ground data for the first time, is set as a point B, and the point immediately before the point B is set as a point A. Further, the point which is corresponding to a test image data greater than the point B and where the read data is greater than the point B for the first time, is set as a point C. If the read data corresponding to the minimum test image data "10" is greater than the ground data, the point corresponding to the data "10" is set as the point B, and the origin (0,0) serves as the point A.

Procedure 2

Then, there are obtained the inclination of the line segment AB connecting the points A, B and the inclination of the line segment BC connecting the points B, C. Based on the inclinations of the line segments AB and BC, the zero-point input data is presumed by one of the following two methods and the second-time test image data is then formed.

More specifically, when the inclination of the line segment AB is not less than the inclination of the line segment BC as shown in FIG. 6B, it is considered that the zero-point input data is present between the points A and B. Then, data values ax, bx, cx corresponding to the points a, b, c which divide the line segment AB in four equal portions, are set as the first three data of the second-time test image data.

On the other hand, when the inclination of the line segment AB is smaller than the inclination of the line segment BC as shown in FIG. 6c, it is considered that the zero-point input data is present in the vicinity of the point D where an extension line of the line segment BC intersects the line of (read data)=(ground data). Then, data values ax, bx, cx corresponding to the points a, b, c which divide the line segment BD in four equal portions, are set as the first three data of the second-time test image data. That is, the data ax in the vicinity of the zero-point input data is the minimum value of the second-time test image data.

Procedure 3

When the first three data values ax, bx, cx of the second-time test image data are determined by presuming the zero-point input data in the manner above-mentioned, other data to be second-time test image data are then determined. More specifically, out of a set of data {16, 28, 40, 52, 64, 76, 88, 100, 112, 133, 152, 171, 190, 210, 229, 248}, data greater than the data cx are adopted as test image data. However, when the total number of the data including the data ax, bx, cx exceeds 16, larger data are excluded from the test image data such that the total data number is equal to 16.

The second-time test image data formed in the manner above-mentioned, contain a larger number of lower-gradation data. Accordingly, when the test images formed based on the first- and second-time test image data are read by the scanner unit 1, there can be obtained read data particularly detailed in the lower-gradation zone. Accordingly, a large number of candidate point data can be obtained in the lower-gradation zone. For example, to reproduce an intermediate-gradation image, the reproduction of lower-gradation zone is extremely important. Accordingly, by obtaining a large number of candidate point data in the lower-gradation zone, more proper gradation correction curve data can be formed.

6. Gradation Correction Curve Data Forming Processing FIG. 7 is a flow chart illustrating a gradation correction curve data forming processing at the step S8 in FIG. 4. First, a reversal correction of candidate point data is made (step S81). Since output image data must be greater as the input image data are greater, the gradation correction curve must be a monotone increasing curve representing that the output data monotonously increase with an increase in input data. In this connection, the candidate points are successively traced in the order of input data value starting with the smallest one. When there is a candidate point where the relationship in value of input data is reverse to the relationship in value of output data, the candidate point data are corrected. More specifically, with the input data of such candidate point data remaining unchanged, the output data is increased or decreased to eliminate the reversal.

Next, based on the candidate point data for which a reversal correction has been made, an interpolation is executed to give output data values corresponding to all the input data values between the candidate points, and there is formed a first preliminary gradation correction curve which is a tentative gradation correction curve (step S82). For example, it is supposed that the image data are 8-bit data (256 gradations) and that the printer output unit 66 is arranged to express the depth or density of each pixel with 10-bit (1024 gradations) image data entered thereinto. In this case, the output data values in the range from 0 to 1023 respectively correspond to the input data values in the range from 0 to 255. It is noted that the lower limit value "0" of the output data corresponds to the lower limit value "0" of the input data and that the upper limit value "1023" of the output data corresponds to the upper limit value "255" of the input data.

The first preliminary gradation correction curve is formed based on the candidate point data for which a reversal correction has been made. However, there are instances where, as a result of the interpolation above-mentioned, the first preliminary gradation correction curve contains a portion which is not a monotone increasing curve. Accordingly, there is executed a processing for correcting such a portion to a monotone increasing curve. Thus, there is obtained a second preliminary gradation correction curve which is a second tentative gradation correction curve (step S83).

Next, there is executed a processing for correcting the second preliminary gradation correction curve at its portion in a higher-gradation zone (step S84). This processing is made for alleviating a sudden change in inclination of the second preliminary gradation correction curve in the higher-gradation zone, thereby to form a third preliminary gradation correction curve which is a third tentative gradation correction curve. This processing is based on the empirical fact that output data must smoothly change with respect to changes in input data. When the gradation correction curve suddenly changes in inclination, this may probably interfere with the reproduction of an intermediate-gradation image in particular. This includes a likelihood that a so-called pseudo-contour occurs in an intermediate-gradation image.

There are instances where, as a result of the correction processing at the step S84, the third preliminary gradation correction curve contains a portion which is not a monotone increasing curve. Accordingly, a processing is executed for correcting such a portion to a monotone increasing curve. Thus, there is obtained a fourth preliminary gradation correction curve which is a fourth tentative gradation correction curve (step S85).

Finally, there is executed, on the fourth preliminary gradation correction curve, a correction processing for alleviating a sudden change in gradation or a gradation jump of the fourth preliminary gradation correction curve (step S86). This completes a gradation correction curve to be referred to by the gradation correction unit 64. A table indicative of this gradation correction curve is stored in the RAM 74. The gradation correction unit 64 is arranged to refer to this table of gradation correction curve based on the values of input image data and to read the output image data from this table.

7. Reversal Correction

FIGS. 8A to 8E illustrate the reversal correction made at the step S81 in FIG. 7. The reversal correction is made according to the following manner.

Procedure 1

As mentioned earlier, the candidate point data are composed of pairs of input and output data. In this connection, the candidate point data are sorted in the order of input data values starting with the smallest one. Then, a candidate point corresponding to the third-smallest input data is set as an observation point (shown by a double circle in FIGS. 8A to 8E).

Procedure 2

Figure 8A:
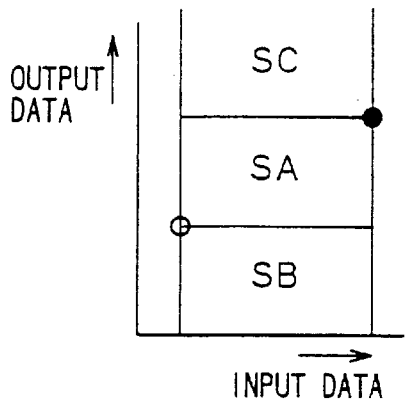
FIGS. 8A, 8B, 8C, 8D and 8E illustrate a candidate point reversal correction processing

Next, there are checked the relationship between the observation point and the candidate point immediately before the observation point (shown by a circle in FIGS. 8A to 8E) and the relationship between the observation point and the candidate point immediately after the observation point (shown by a black dot in FIGS. 8A to 8E). More specifically, as shown in FIG. 8A, the output data zone is divided into three zones, i.e., a zone SB smaller than the output data value of the just previous candidate point, a zone SA between the output data value of the just previous candidate point and the output data value of the just subsequent candidate point, and a zone SC greater than the output data of the just subsequent candidate point, and it is judged in which zone the output data of the observation point is located.

Figure 8B:
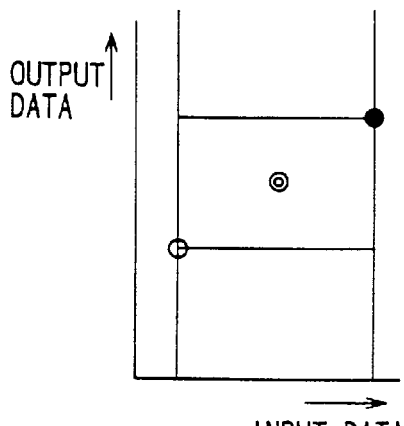

FIG. 8B shows the case where the output data of the observation point is located in the zone SA between the output data of the just previous and subsequent candidate points. In this case, no correction is made on the data of the observation point.

Figure 8C:
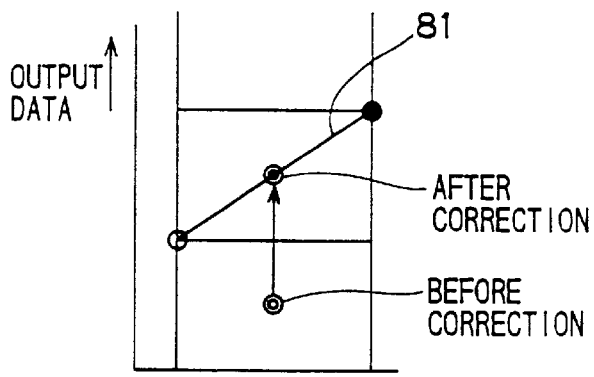

FIG. 8C shows the case where the output data of the observation point is smaller than the output data of the just previous candidate point and is therefore located in the zone SB. In this case, the output data of the observation point is pulled up to a position on a line segment 81 connecting the just previous and subsequent candidate points to each other.

Figure 8D:
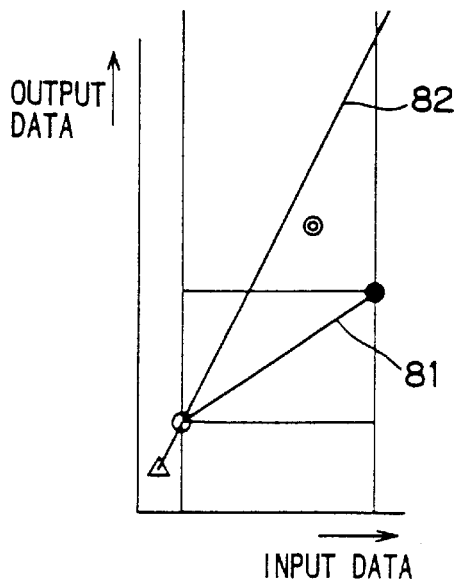
Figure 8E:
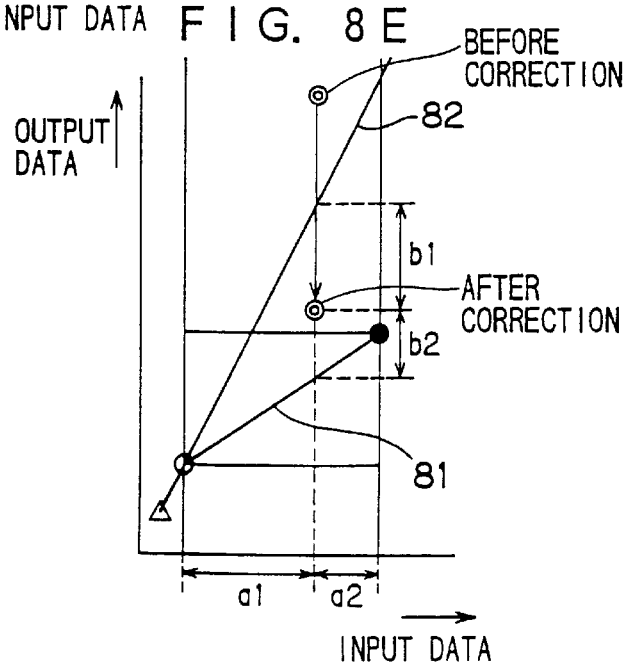

FIGS. 8D and 8E show the case where the output data of the observation point is greater than the output data of the just subsequent candidate point and is therefore located in the zone SC. In this case, the output data of the just previous candidate point and the output data of the further previous candidate point (shown by a triangle in FIGS. 8D, 8E) are jointly referred to. That is, there is supposed a straight line 82 connecting the just previous candidate point and the further previous candidate point.

When the observation point is located in a position under the straight line 82, that is, when the output data of the observation point is smaller than the output data of the point on the line 82 corresponding to the input data of the observation point, as shown in FIG. 8D, no correction is made on the output data of the observation point. This is because it is considered that there is a high possibility of the output data of the candidate point just after the observation point being erroneous.

On the other hand, when the observation point is located in a position above the straight line 82, that is, when the output data of the observation point is greater than the output data of the point on the straight line 82 corresponding to the input data of the observation point as shown in FIG. 8E, a correction is made to pull down the output data of the observation point. More specifically, the output data of the observation point is corrected based on the ratio of the difference a1 in input data between the observation point and the just previous candidate point, to the difference a2 in input data between the observation point and the just subsequent candidate point. The difference in output data between the corrected observation point and the point on the straight line 82 corresponding to the input data of the observation point, is now defined as b1, and the difference in output data between the corrected observation point and the point on the straight line 81 corresponding to the input data of the observation point, is now defined as b2. Now, the following equation is established for a1, a2, b1, b2;

b1:b2=a1:a2

Procedure 3

When the processing of the procedure 2 is finished for a certain observation point, the observation point is transferred to the subsequent candidate point, on which the processing of the procedure 2 is then executed. When the observation point is the final candidate point, the processing is finished.

It is noted that the origin (0,0) and the final point (255, the upper limit value of the output data) are indispensable points and these two points are added as candidate points.

8. Interpolation of Candidate Points

FIGS. 9A, 9B, 10A, 10B illustrate a processing for interpolating the candidate point data for which a reversal correction has been made (step S82 in FIG. 7). The X axis shows input data and the Y axis shows output data.

The following shows a process for interpolating the candidate point data to form the first preliminary gradation correction curve.

Procedure 1

Figure 9A:
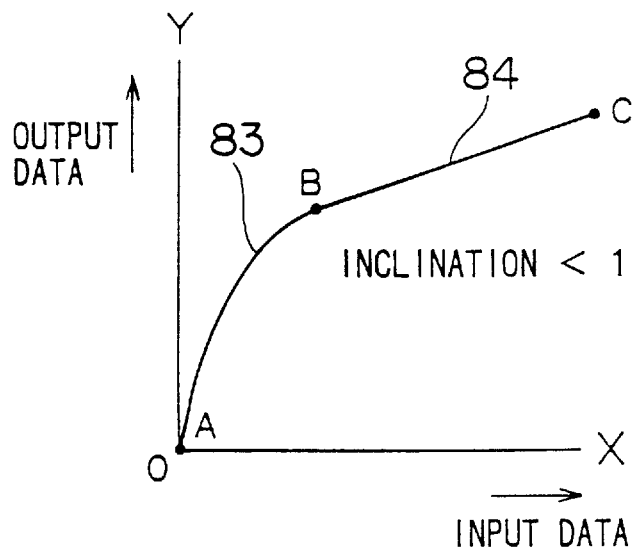
FIGS. 9A and 9B illustrate a candidate point interpolation processing.

As shown in FIG. 9A, with the first candidate point (origin) set as the point A and the second candidate point set as the point B, the portion between the points A and B is interpolated using a quadratic curve 83 in which the point B serves as the pole.

Procedure 2

Next, out of candidate points each of which distance from the point B in the X-axis direction is greater than 4, the candidate point nearest to the point B is set as the point C, and the portion between the points B and C is interpolated using a straight line 84.

Figure 9B:
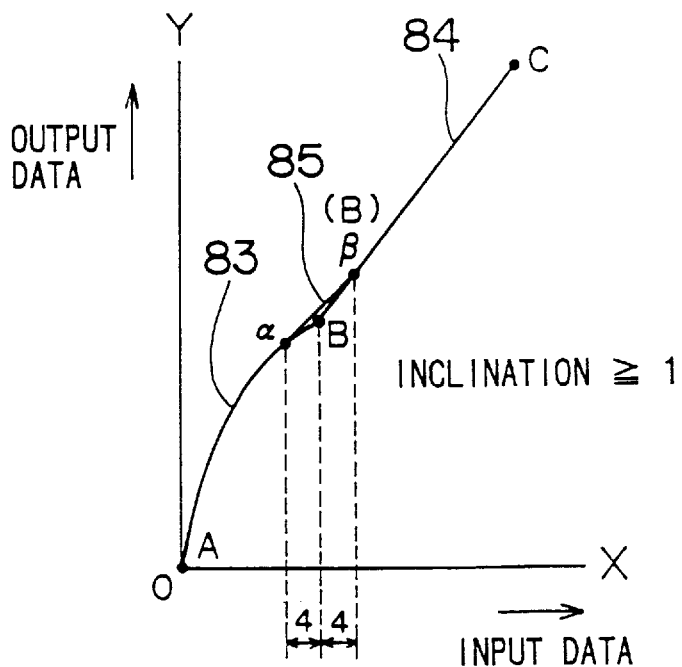

As shown in FIG. 9B, when the inclination of the straight line 84 passing through the points B and C is not less than 1 (the angle of the straight line 84 with respect to the X axis is not less than 45°), there is interpolated, using a straight line 85, the portion between (i) the point α on the quadratic curve 83 corresponding to the X-coordinate subtracted by 4 from the X-coordinate of the point B and (ii) the point β on the straight line BC corresponding to the X-coordinate added by 4 to the X-coordinate of the point B. Then, the point β is newly set as the point B. This smoothly connects the quadratic curve 83 to the straight line 84 by the straight line 85, thus alleviating a sudden change in gradation.

Procedure 3

Figure 10A:
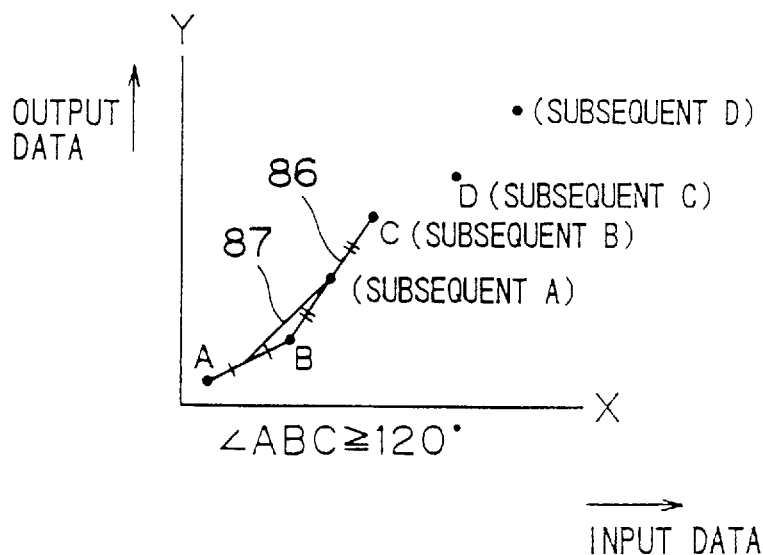
FIGS. 10A and 10B illustrate a candidate point interpolation processing.
Figure 10B:
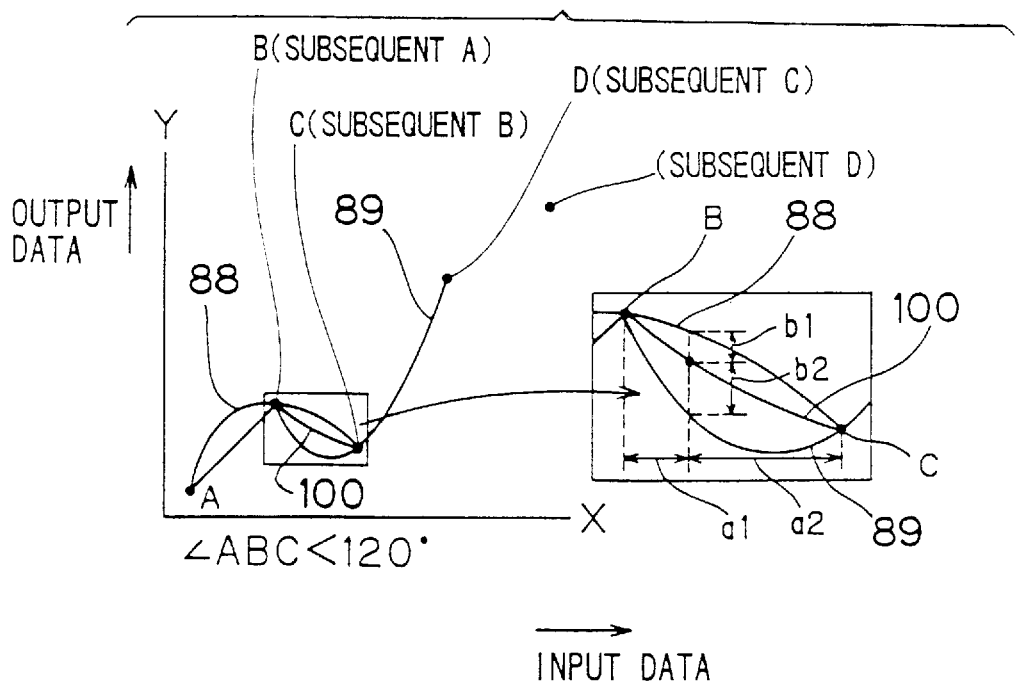

Further, there are set the point B as the new point A, the point C as the new point B, the candidate point on the right side of the point C as the new point C and the candidate point on the right side of the new point C as the point D, and an interpolation processing is executed as shown in FIGS. 10A and 10B.

More specifically, there is first obtained the angle ∠ABC formed by the straight lines AB and BC. When this angle is ∠ABC is not less than 120°, the processing shown in FIG. 10A is executed, and when the angle ∠ABC is less than 120°, the processing shown in FIG. 10B is executed.

In the processing shown in FIG. 10A, the zone between the points B and C is interpolated by a straight line 86, and the zone between the middle point of the line segment AB and the middle point of the line segment BC is again interpolated by a straight line 87. The middle point of the line segment BC is set as the new point B.

In the processing shown in FIG. 10B, there are supposed a quadratic curve 88 passing through the points A, B, C, and a quadratic curve 89 passing through the points B, C, D. The zone between the points B and C is interpolated by a curve 100 passing between the two quadratic curves 88, 89. More specifically, each of interpolated output data is determined such that the ratio of the difference a1 in input data between the interpolated point and the point B to the difference a2 in input data between the interpolated point and the point C, is equal to the ratio of the difference b1 in output data between the interpolated point and the corresponding point on the curve 88 to the difference b2 in output data between the interpolated point and the corresponding point on the curve 89.

Procedure 4

When the point D is not the final candidate point, the sequence is returned to the procedure 3. When the point D is the final candidate point, the zone between the points C and D is interpolated by a straight line and the processing is then finished. Thus, the first preliminary gradation correction curve is completed.

9. Correction to Monotone Increasing Curve

FIGS. 11A and 11B illustrate a processing of correction to a monotone increasing curve (steps S84, S85 in FIG. 7). The X axis shows input data, while the Y axis shows output data. The correction to a monotone increasing curve is made on the first and third preliminary gradation correction curves. FIG. 11A shows an example of the first or third preliminary gradation correction curve before correction, and FIG. 11B shows an example of the second or fourth preliminary gradation correction curve obtained after correction.

The processing of correction to a monotone increasing curve is executed in the following manner.

Procedure 1

An observation point is set as the origin (0, 0) of the curve to be corrected (the first or third preliminary gradation correction curve).

Procedure 2

While successively increasing the input data value by 1, the observation point is positionally shifted successively to search a maximal point. The maximal point is an observation point of which Y-coordinate is greater than the Y-coordinate of the point immediately after the observation point. When no maximal point is found, the processing of correction to a monotone increasing curve is finished.

Procedure 3

When such a maximal point is found, the following operation is executed.

As shown in FIG. 11B, a point A is set as the maximal point, and a minimal point appearing for the first time after the point A is set as a point B. There is set, as a point C, the point which is located after the point B and on the curve to be corrected and of which Y-coordinate is equal to the Y-coordinate of the point A. Further, there is set, as a point D, the point which is located after the point C and of which Y-coordinate is greater, by the difference in Y-coordinate between the points B and C, than the Y-coordinate of the point C.

The zone between the points A and C is corrected to a straight line 90 which bisects the zone between the straight lines AD and AC, and the zone between the points C and D is corrected to a curve 91 which bisects the zone between the straight line AD and the curve to be corrected. Thus, the zone between the points A and D is corrected to a monotone increasing curve.

Procedure 4

The observation point is moved to the point on the immediate right side of the point D, and the sequence is returned to the procedure 2. When the point D is the final point (input data "255"), the processing is finished.

10. Correction of Higher-Gradation Zone

FIGS. 12A and 12B and FIGS. 13A and 13B illustrate the processing of correcting the curve at its portion in the higher-gradation zone (step S84 in FIG. 7). The X axis shows input data, while the Y axis shows output data.

It has been experimentally apparent that a candidate-point interpolation processing causes the curve to contain, in the higher-gradation zone, a portion of which inclination undergoes a sudden change. To alleviate such a sudden change in inclination, the processing is executed in the following manner.

Procedure 1

The coordinate system is compressed such that the X and Y axes are equal in scale to each other. For example, it is now supposed that the image data supplied from the selector unit 63 (See FIG. 2) to the gradation correction unit 64, represent the depths or densities of the pixels in 256 gradations from 0 to 255 and that the printer output unit 66 supplies, to the laser scanning unit 21, a signal indicative of the depths or densities of the pixels in the 1024 gradations from 0 to 1023. In such a case, the gradation correction unit 64 is to convert an 8-bit input image data into a 10-bit output image data. Thus, the Y-coordinate corresponding to the output data is compressed to ¼.

Procedure 2

On the plane of compressed coordinates, the final point (255, 255) of the second preliminary gradation correction curve is set as a point C, the candidate point on the immediate left side of the point C is set as a point B, and the candidate point on the immediate left side of the point B is set as a point A. Here, a candidate point refers to that point on the second preliminary gradation correction curve corresponding to the input data of the candidate point data.

Procedure 3

While the points A and B are shifted leftward by one point (moved to the immediately previous candidate points) with the point C fixed, there is searched the first points A and B such that the angle ∠ABC is smaller than 150°. FIG. 12A shows the case where the angle ∠ABC is not less than 150°, while FIG. 12B shows the case where the ∠ABC is smaller than 150°.

It is generally understood based on the empirical fact that, in the gradation correction curve to be finally set, the ratio of changes in output data to changes in input data is small in the higher-gradation zone and the ratio of changes in output data to changes in input data is relatively great in the intermediate-gradation zone. Accordingly, the curve undergoes a sudden change in inclination in the vicinity of the transition zone from the intermediate-gradation zone to the higher-gradation zone. In the procedure 3, there is searched such a portion where the curve undergoes a sudden change in inclination.

However, at the time when the X coordinate of the point A is smaller than 170, the search is terminated and the compression of the coordinate system is released, thus finishing the processing of correction in the higher-gradation zone.

Procedure 4

When the angle ∠ABC is smaller than 150°, the radius r of a circle indicative of the zone to be interpolated is calculated according to the following equation:

$$r = \frac{(360 - 150) - \angle ABC}{120} \times a \qquad (1)$$

wherein a is the length of the line segment BC connecting the points B and C to each other.

As shown in FIG. 12C, there are obtained (i) a point A' where the circle 92 having the radius r around the point B (which represents the range to be interpolated) intersects the second preliminary gradation correction curve and (ii) a point C' where the circle 92 intersects the line segment BC.

The equation (1) is arranged such that r is equal to a when ∠ABC is equal to 90° and that r is equal to a/2 when ∠ABC is equal to 150°. This alleviates the sudden change in curve inclination. For example, when ∠ABC is equal to 90°, this corresponds to the case where the change in curve inclination is maximized. In such a case, the radius r of the circle indicative of the range to be interpolated, is equal to a, enabling the interpolation to be smoothly made.

Procedure 5

Dependent on the inclination of the straight line AB, the inclination of the straight line BC and the inclination of the straight line A'B, the processing is executed according to the following procedure 6 or 7.

The processing of procedure 6 is executed when the inclination of the line AB is greater than the inclination of the line BC and the inclination of the line AB is greater than the inclination of the line A'B, or when the inclination of the line AB is smaller than the inclination of the line BC and the inclination of the line AB is smaller than the inclination of the line A'B. Otherwise, the processing of procedure 7 is executed.

Procedure 6

As shown in FIG. 13A, the zone between the point A' and the point C' is interpolated by a straight line 93.

Procedure 7

As shown in FIG. 13B, the zone between the points A' and C' is interpolated by a circular arc 94 having the center D where the straight line passing through the point A' and at a right angle to the straight line A'B, intersects the straight line passing through the point C' and at a right angle to the straight line BC' (the circular arc 94 comes in contact with the respective straight lines A'B and BC at the points A' and C').

Procedure 8

There are set the point A' as the new point C, the candidate point on the immediate left side of this new point C as the new point B and the candidate point on the immediate left side of this new point B as the new point A, and the sequence is returned to the procedure 3.

11. Alleviation of Gradation Change and Jump

The processing at the step S86 in FIG. 7 is to be executed for smoothing the fourth preliminary gradation correction curve. More specifically, this processing is executed in the following manner.

Procedure 1

Based on the data of three points A, B, C of which input data are continuous, there are obtained the inclinations of the line segments AB and BC.

Procedure 2

Based on the difference in inclination between the line segments AB and BC, the variation of the inclination is obtained.

Procedure 3

When the inclination variation is not less than 5, the average of the Y-coordinates (output data) of the points A and B, is set as the Y-coordinate (output data) of the point B.

Procedure 4

Until the inclination variation becomes smaller than 5 at any portion of the curve to be processed, the procedures 1 to 3 are repeated.

12. Examples of the Processings

FIGS. 14A, 14B, 14C, 14D and FIGS. 15A and 15B show the results of the processings actually executed for forming the gradation correction curve for magenta. FIG. 14A shows read data obtained by reading the test image by the scanner unit 1, FIG. 14B shows the initial gradation correction curve, and FIG. 14C shows the reference output curve. The candidate point data obtained based on these read data, the initial gradation correction curve and the reference output curve, are shown in FIG. 14D. It is understood from FIG. 14D that a sufficiently large number of candidate points were obtained in the lower-gradation zone as a result of forming and reading the two test images.

By executing a reversal correction processing on candidate point data in FIG. 14D, the candidate point data shown in FIG. 15A are obtained. By executing, on the candidate point data after subjected to the reversal correction, an interpolation processing, a processing of correction to a monotone increasing curve and a processing of correction in the higher-gradation zone, the monotone increasing curve shown in FIG. 15B is finally formed as the gradation correction curve.

13. Summary

According to the embodiment discussed in the foregoing, the gradation correction curve data are automatically operated and set based on the read data obtained by reading the test images, the initial gradation correction curve data and the reference output curve data. Accordingly, much of the output gradation adjustment job can be automated and proper adjustment can securely be made regardless of the degree of skill of the person in charge of adjustment.

Further, a zero-point input data is presumed based on the first-time read data of the test image, and new test image data are then obtained with a value in the vicinity of the presumed zero-point input data serving as the minimum value, and using the new test image data thus obtained, another test image is formed and read at the second time. Accordingly, a large number of significant read data can be obtained. It is therefore possible to operate more suitable gradation correction curve data as compared with the case where the test image is to be formed only one time, or the case where the second-time test image data are set with no consideration on the first-time read data of test image taken into consideration. In particular, the second-time test image data contain a relatively large number of data corresponding to the lower-gradation zone. This advantageously adjusts properly the output gradations in the lower-gradation zone.

The process for forming gradation correction curve data using the candidate point data obtained based on the read data, the initial gradation correction curve data and the reference output curve data, merely contains relatively simple processings such as a reversal correction of candidate point data, a processing of correction to a monotone increasing curve, a processing of interpolation of candidate points using a linear or quadratic curve. This prevents the operation of gradation correction curve data from taking much time, enabling the output gradation adjustment processing to be completed in a short period of time.

14. Other Embodiments

In the embodiment above-mentioned, the description has been made of a color digital copying machine as an example. However, the present invention can widely be applied to apparatus for supplying an image based on image data such as a monochrome copying machine, a color printer or the like.

Thus, the embodiment of the present invention has been discussed in detail. However, this embodiment is merely a specific example for clarifying the technical contents of the present invention and the present invention is not to be construed in a restricted sense as limited to this specific example. Thus, the spirit and scope of the present invention are limited only by the appended claims.

This application is based on applications Nos. 8-041800 and 8-041801 filed in Japan, the content of which is incorporated hereinto by reference.

What is claimed is:

1. A method of adjusting output gradations of an image output apparatus in which input image data are corrected according to a gradation correction curve and an image is supplied based on the corrected image data, the method comprising the steps of:

setting initial gradation correction curve data to the image output apparatus;

entering, into the image output apparatus, predetermined test image data corresponding to a plurality of gradations to supply a test image corresponding to the test image data;

reading the supplied test image by optical reading means to obtain read data thereof;

operating, based on (i) the read data, (ii) reference output curve data indicative of reference output gradations for input image data and (iii) the initial gradation correction curve data, to generate gradation correction curve data matched to the image output apparatus such that an input/output characteristics of the image output apparatus conform to the reference output curve data; and setting the gradation correction curve data to the image output apparatus.

2. A method according to claim 1, further comprising the steps of:

presuming, based on the read data, a zero-point input data corresponding to a density value of a ground part of the test image and forming a set of new test image data using, as a minimum value, a value in the vicinity of the presumed zero-point input data;

entering the new test image data into the image output apparatus to which the initial gradation correction curve data have been set, and causing the image output apparatus to execute a second-time image output, thereby to form a test image; and reading the test image formed by the second-time image output, by the optical reading means to obtain read data of the test image, the second-time read data being also used at the gradation correction curve data operating step.

3. An image output apparatus for supplying an image based on input image data, comprising:

gradation correction curve memory means for storing gradation correction curve data;

gradation correction means for correcting input image data according to the gradation correction curve data stored in the gradation correction curve memory means and for supplying the corrected data;

image output means for supplying an image based on the data corrected by the gradation correction means;

reference output memory means for storing reference output curve data indicative of reference output gradations for input image data;

means for storing initial gradation correction curve data to the gradation correction curve memory means;

means for supplying, to the gradation correction means, predetermined test image data corresponding to a plurality of gradations with the initial gradation correction curve data set to the gradation correction curve memory means, and for causing the image output means to supply a test image corresponding to the test image data;

optical reading means for optically reading the supplied test image and for supplying data thus read;

gradation correction curve operating means for operating, based on (i) the read data, (ii) the reference output curve data and (iii) the initial gradation correction curve data, to generate gradation correction curve data matched to the image output apparatus such that input/output characteristics of the image output apparatus conform to the reference output curve data; and means for storing, to the gradation correction curve memory means, the gradation correction curve data generate by the gradation correction curve operating means.

4. An image output apparatus according to claim 3, further comprising:

test image data forming means for presuming, based on the read data, a zero-point input data corresponding to a density value of a ground part of the test image and for forming a set of new test image data with a value in the vicinity of the presumed zero-point input data serving as a minimum value; and means for entering the test image data formed by the test image data forming means, into the gradation correction means with the initial gradation correction curve data set to the gradation correction curve memory means, and for causing the image output means to execute a second-time image output, thereby to form a test image, the gradation correction curve operating means being arranged to operate the gradation correction curve data using also read data obtained by reading the second-time output test image by the optical reading means.

5. A method of forming a gradation correction curve for correcting input image data to output image data matched to input/output characteristics of an image output apparatus, the method comprising:

a step of operating, based on an output result obtained by causing the image output apparatus to supply a predetermined test image, to generate a plurality of candidate points to be located on a gradation correction curve;

a reversal correction step of correcting, out of the plurality of candidate points, a candidate point where a relationship in size between output image data is reverse to a relationship in size between input image data, such that the output image data monotonously increase with respect to an increase in input image data; and a gradation correction curve operating step of forming a gradation correction curve based on the candidate point for which the reversal correction has been made.

6. A method according to claim 5, wherein the reversal correction step includes the steps of:

successively determining, as observation points, a plurality of candidate points in an order of values of the output image data starting with a smallest one;

executing a correction processing such that, when the output image data of an observation point is smaller than the output image data of the candidate point immediately before the observation point, the output image data of the observation point is corrected to a value between the output image data of the candidate points immediately before and after the observation point; and executing a correction processing such that, when the output image data of an observation point is not less than the output image data of the candidate point immediately after the observation point, the output image data of the observation point is decreased provided that the output image data of the observation point is smaller than the output image data of the corresponding point on a straight line connecting the candidate point immediately before the observation point to the candidate point immediately before the candidate point immediately before the observation point.

7. A method according to claim 5, wherein the gradation correction curve operating step includes an interpolation step of interpolating a zone between two candidate points using a straight line, a quadratic curve and a curve to be formed by referring to a quadratic curve.

8. A method according to claim 7, wherein the interpolation step includes the steps of:

interpolating a zone between an origin and a candidate point next thereto using a quadratic curve;

interpolating a zone among three candidate points using a straight line when an angle formed by two line segments each connecting two candidate points out of the three candidate points, is not less than a predetermined angle; and interpolating a zone among three candidate points, referring to (i) a quadratic curve passing through the three candidate points, and (ii) a quadratic curve passing through two candidate points out of the three candidate points and another candidate point, using a curve passing between the two quadratic curves, when an angle formed by two line segments each connecting two candidate points out of the three candidate points, is smaller than the predetermined angle.

9. A method according to claim 7, wherein the gradation correction curve operating step further includes a step of correcting the curve formed through the interpolation step, to a monotone increasing curve.

10. A method according to claim 9, wherein the step of correction to a monotone increasing curve includes the steps of:

searching a maximal point in a curve to be processed;

searching a minimal point subsequent to the maximal point;

searching, subsequent to the search of the minimal point, that point on the curve to be processed of which output image data is equal to the output image data of the maximal point, the point thus searched being set as a first point;

searching, subsequent to the search of the first point, that point on the curve to be processed of which output image data is greater, by a difference in output image data between the maximal and minimal points, than the output image data of the first point, the point thus searched being set as a second point;

correcting the curve to be processed a t its portion between the maximal point and the first point, to a straight line which passes through the maximal point and of which output image data are gradually increased with an increase in input image data; and correcting the curve to be processed at its portion between the first and second points, to a curve which passes between a straight line connecting the maximal point to the second point and the curve to be processed and which is connected to the straight line passing through the maximal point.

11. A method according to claim 5, wherein the gradation correction curve operating step further includes a higher-gradation portion correcting step of correcting, to a straight line or a circular arc, the curve to be processed at its higher-gradation portion of which change in inclination is not less than a predetermined value, such that the change in inclination is alleviated.

12. A method according to claim 11, wherein the gradation correction curve operating step further includes a step of correcting the curve formed through the higher-gradation portion correcting step, to a monotone increasing curve.

13. A method according to claim 12, wherein the step of correction to a monotone increasing curve comprises:

searching a maximal point in a curve to be processed;

searching a minimal point subsequent to the maximal point;

searching, subsequent to the search of the minimal point, that point on the curve to be processed of which output image data is equal to the output image data of the maximal point, the point thus searched being set as a first point;

searching, subsequent to the search of the first point, that point on the curve to be processed of which output image data is greater, by a difference in output image data between the maximal and minimal points, than the output image data of the first point, the point thus searched being set as a second point;

correcting the curve to be processed at its portion between the maximal point and the first point, to a straight line which passes through the maximal point and of which output image data are gradually increased with an increase in input image data; and correcting the curve to be processed at its portion between the first and second points, to a curve which passes between a straight line connecting the maximal point to the second point and the curve to be processed and which is connected to a straight line passing through the maximal point.

14. A method according to claim 5, wherein the gradation correction curve operating step further includes a step of correcting the gradation correction curve such that a change in inclination of the gradation correction curve is smaller than a predetermined value.

* * * * *